United States Patent [19]

Leverenz

[11] 3,862,117
[45] Jan. 21, 1975

[54] CYANOARYL-THIODIAZOLE-AZO DYESTUFF

[75] Inventor: Klaus Leverenz, Leverkusen, Germany

[73] Assignee: Bayer Aktiengesellschaft, Leverkusen, Germany

[22] Filed: Feb. 11, 1972

[21] Appl. No.: 225,618

[30] Foreign Application Priority Data
Feb. 11, 1971 Germany............................ 2106585

[52] U.S. Cl...................... 260/158, 8/41 C, 8/41 D, 260/154, 260/155, 260/156, 260/250 R, 260/288 R, 260/293.68, 260/296 R, 260/302 D, 260/304, 260/306.8 D, 260/325, 260/326.1, 260/326.85
[51] Int. Cl...... C09b 39/08, D06p 3/00, D06p 3/52
[58] Field of Search...... 260/158, 306.8 D, 306.8 R, 260/154, 158

[56] References Cited
UNITED STATES PATENTS
| | | | |
|---|---|---|---|
| 3,414,559 | 12/1968 | Sartori.............................. | 260/158 |
| 3,578,654 | 5/1971 | Favre................................ | 260/186 |
| 3,719,489 | 3/1973 | Cieciuch et al................. | 260/158 X |

Primary Examiner—Floyd D. Higel
Attorney, Agent, or Firm—Plumley & Tyner

[57] ABSTRACT

Azo dyestuff of the formula

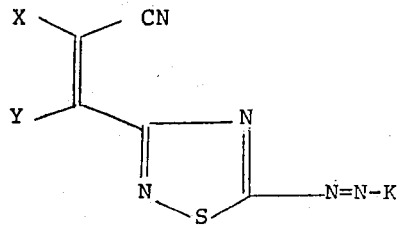

in which
X and Y, independently of one another, are alkyl, cycloalkyl, aralkyl, or aryl, and in which X and Y together may form the residual member of a fused aromatic-carbo-cyclic or aromatic-heterocyclic ring which may be partially hydrogenated; and
K is the radical of a coupling component; and processes for the production of such dyestuffs. These dyestuffs are useful for dyeing and printing synthetic fiber materials such as polypropylene, cellulose acetates, polyurethanes, polyamides and polyesters; the dyeings having good general fastness properties especially better fastness to sublimation.

5 Claims, No Drawings

CYANOARYL-THIODIAZOLE-AZO DYESTUFF

The subject-matter of the present invention comprises aminothiodiazoles of the formula

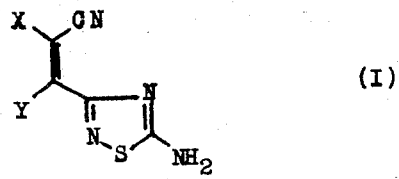

(I)

in which
X and Y, independently of one another, stand for alkyl, cycloalkyl, aralkyl or aryl radicals, and in which X and Y together may form the residual members of a fused aromatic-carbocyclic or aromatic-heterocyclic ring which may be partially hydrogenated,
as well as processes for their production.

Suitable aromatic-carbocyclic rings which may be partially hydrogenated are benzene, naphthalene, tetralin, indane, anthracene, phenanthrene and other rings, the benzene and naphthalene rings being particularly suitable.

These rings may contain further substituents, such as nitro, $CF_3$, alkyl, cycloalkyl, aralkyl, aryl, halogen, alkoxy, aryloxy, alkylcarbonyl, arylcarbonyl, alkyl-carbonylamino, aryl-carbonylamino, alkyl-sulphonylamino, aryl-sulphonylamino, alkylsulphonyl, aralkylsulphonyl, aryl-sulphonyl radicals and sulphamoyl and carbamoyl radicals which are preferably substituted by alkyl groups.

The aryl radicals mentioned above preferably comprise phenyl and naphthyl radicals.

Suitable alkoxy radicals are mainly those with 1 – 5 carbon atoms.

Suitable alkyl radicals are primarily those with 1 – 5 carbon atoms.

Suitable aralkyl radicals are mainly the benzyl and phenylethyl radicals.

A suitable cycloalkyl radical is, for example, the cyclohexyl radical.

Suitable heterocyclic rings formed by X and Y together with the ethylene group are pyridine, quinoline, thiophen, thionaphthene, dibenzofuran and pyrazine rings and, in particular,

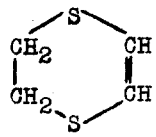

These rings, too, may carry further substituents, such as, for example, $C_1$-$C_4$-alkyl radicals, halogen atoms, preferably chlorine, and optionally substituted phenyl radicals.

A preferred class of aminothiodiazoles according to the invention corresponds to the formula

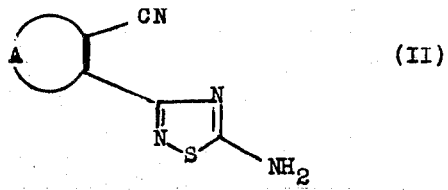

(II)

in which A stands for the radicals

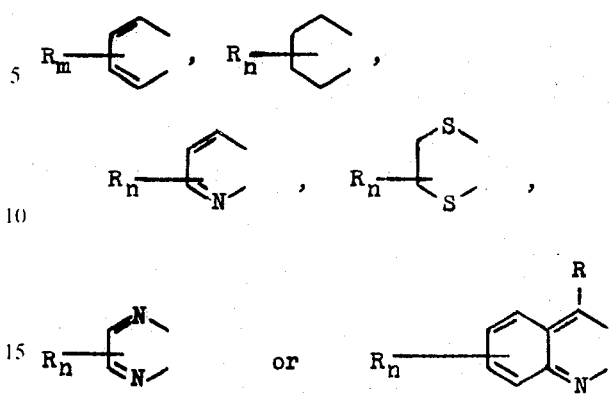

where R means hydrogen, $C_1$-$C_4$-alkyl, phenyl, $CF_3$, halogen, $NO_2$, $C_1$-$C_4$-alkylsulphonyl, phenylsulphonyl or $C_1$-$C_4$-alkoxy; $m$ stands for 1, 2 or 3; and $n$ stands for 1 or 2.

A class of compounds within the scope of the formulae (I) or (II) which is particularly preferred has the formula

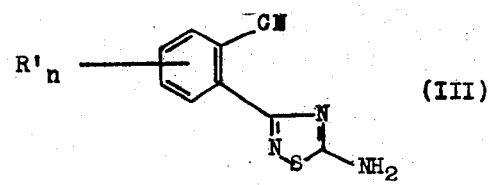

(III)

in which R' stands for hydrogen, methyl, phenyl, chlorine, $NO_2$, $CH_3SO_2$ or methoxy, and $n$ stands for 1 or 2, as well as the compound

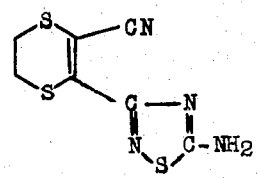

The new aminothiodiazoles of the formula (I) are obtained when amino-imino-pyrrolenines of the formula

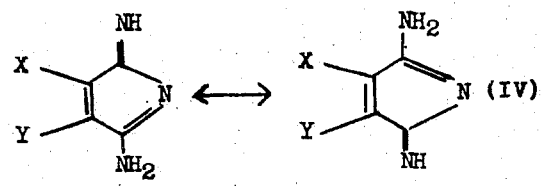

(IV)

in which X and Y have the same meaning as above, are reacted in any sequence (a) with hypohalous acids or their salts, and (b) with thiocyanic acid or its salts.

A preferred variant of the process is characterised in that, in a first step, amino-imino-pyrrolenines of the formula (IV) are converted by the reaction with hypohalous acids or their salts at temperatures of −30 to 30°C, preferably at −10 to 20°C, into the corresponding N-halogen compounds of the probable formula

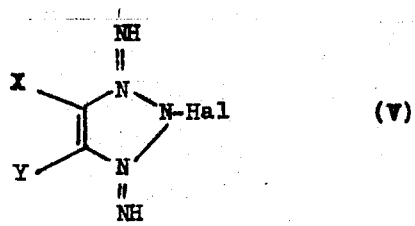

in which X and Y have the same meaning as above; and

Hal stands for halogen, preferably Cl and Br, and these compounds are then reacted with thiocyanic acid or its salts at temperatures of −10 to 100°C, preferably at 0° to 50°C.

Another variant of the process is characterised in that the amino-imino-pyrrolenines of the formula (IV) are converted into the corresponding thiocyanic acid salts of the formula

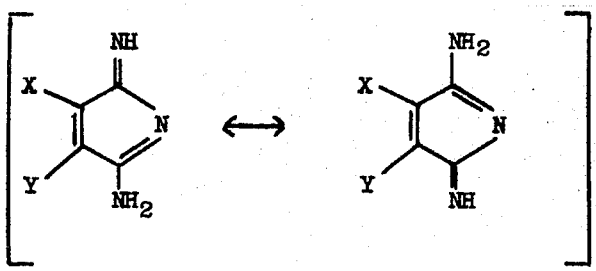

in which X and Y have the same meaning as above, and these compounds are treated with hypohalous acids or their salts at temperatures of −30 to 30°C, preferably at −10 to 10°C.

It must be regarded as definitely surprising that these reactions proceed so smoothly under these mild conditions, since, apart from thermolysis which occurs under substantially more drastic conditions, no reactions of pyrrolenines of this type have hitherto been disclosed which proceed with ring cleavage and the formation of a nitrile group; the formation of the new aminothiodiazoles was therefore by no means foreseeable.

The reaction of the N-halogen compounds of the formula (V) with thiocyanic acid or its salts to form the aminothiodiazoles of the formula (I) can be carried out in an aqueous, organic or aqueous-organic medium. As the reaction is exothermic, cooling of the reaction mixture may be necessary, depending on the type of reaction components. Suitable organic solvents are primarily those which are largely inert towards the reaction components in the above-mentioned preferred temperature range from about 0° to 50°C. Solvents which have proved particularly satisfactory are alcohols, such as methanol, ethanol, n- and i-propanol, n-, i- and tert.-butanol; ethers such as diethyl ether, di-isopropyl ether, di-isobutyl ether, methyl glycol, ethyl glycol and dioxan; acid amides such as dimethyl formamide, dimethyl acetamide, N-methyl-pyrrolidone, tetramethylurea, hexamethyl-phosphoric acid trisamide; furthermore, tetramethylene-sulphone, dimethyl sulphoxide, tetrahydrofuran, nitromethane, nitropentane, o-dichlorobenzene, nitrobenzene, pyridine, methylpyridine, quinoline, methyl-quinoline, as well as mixtures of these solvents.

The expedient procedure for carrying out this reaction in practice consists in slurrying a N-halogen compound (V) with a suitable solvent, for example, methanol, at room temperature; then adding the equivalent amount of a salt of thiocyanic acid, for example, NH₄SCN, in powdered form or as an aqueous or methanolic solution, with stirring and possibly with cooling, in such a manner that the temperature does not exceed 50°C; and then, if necessary, completing the reaction by heating to 60° − 70°C or by boiling under reflux. The reaction is completed when a sample acidified with acetic acid no longer leads to spontaneous discoloration of KI-starch paper. The reaction products are precipitated or they are isolated by conventional methods of working up, such as precipitation with water or concentration of the solution.

The N-halogen compounds of the formula (V) required as starting materials are new and are therefore likewise a subject-matter of the present invention. These highly reactive compounds are colourless to yellow crystalline, sometimes also amorphous, substances melting almost exclusively with decomposition, mostly above 200°C. These compounds are obtained by known methods for the preparation of N-halogen compounds (cf. e.g., Houben-weyl: "Methoden der organischen Chemie," Vol. V/3, 796, and V/4, 32) by reacting amino-imino compounds of the formula (IV) or their salts (with the exception of the thiocyanates) with organic or inorganic hypohalites in suitable solvents and, advantageously, in the presence of acid-binding agents, at temperatures of −25 to 25°C, preferably at −10 to 10°C; it is of no importance for the desired course of the reaction whether the hypohalite is prepared separately and added to (IV) or whether elementary halogen is caused to react on a solution or suspension of (IV) and an acid acceptor.

Suitable reaction media in which N-halogenation is carried out are water and/or water-miscible solvents such as methanol, tert.-butanol, dimethyl formamide, dimethyl acetamide, N-methyl-pyrrolidone, hexamethyl-phosphoric acid trisamide, dioxan, pyridine, methylpyridine, tetramethylenesulphone, tetramethyl-urea or tetrahydrofuran.

Suitable hypohalites are potassium, sodium, calcium and t-butyl hypochlorite and hypobromite.

Suitable acid-binding agents are alkali metal and alkaline earth metal hydroxides, alcoholates, carbonates and bicarbonates, as well as pyridine, picolines, and others.

Suitable imino-amino compounds of the formula (IV) are: 2-amino-5-imino-3,4-dimethyl-pyrrolenine, 2-amino-5-imino-3,4-diethyl-pyrrolenine, 2-amino-5-imino-3,4-dicyclohexyl-pyrrolenine, 2-amino-5-imino-3,4-diphenyl-pyrrolenine and, preferably, 1-amino-3-imino-iso-indolenine, 1-amino-3-imino-5(6)-methyl-isoindolenine, 1-amino-3-imino-5(6)-tert.-butylisoindolenine, 1-amino-3-imino-5(6)-cyclohexyl-isoindolenine, 1-amino-3-imino-5(6)-phenyl-isoindolenine, 1-amino-3-imino-5(6)-β-naphthyl-isoindolenine, 1-amino-3-imino-4,5,6,7-tetrahydro-isoindolenine, 1-amino-3-imino-4(7)-chloro-isoindolenine, 1-amino-3-imino-5(6)-chloro-isoindolenine, 1-amino-3-imino-5,6-dichloro-isoindolenine, 1-amino-3-imino-4(7)-nitro-isoindolenine, 1-amino-3-imino-5(6)-nitro-isoindolenine, 1-amino-3-imino-5(6)-methoxy-isoindolenine, 1-amino-3-imino-5(6)-ethoxy-isoindolenine, 1-amino-3-imino-5(6)-benzyloxy-isoindolenine, 1-amino-3-imino-5(6)-phenoxy-isoindolenine, 1-amino-3-imino-5(6)-methylmercapto-isoindolenine, 1-amino-3-imino-5(6)-phenylmercapto-isoindolenine, 1-amino-3-imino-5(6)-benzylmercapto-isoindolenine, 1-amino-3-imino-5(6)-methylsulphonyl-isoindolenine, 1-amino-3-imino-5(6)-ethylsulphonyl-isoindolenine, 1-amino-3-imino-5(6)-benzylsulphonyl-isoindolenine, 1-amino-3-imino-5(6)-phenyl-sulphonyl-isoindolenine, 1-amino-3-imino-5(6)-acetylamino-isoindolenine, 1-amino-3-imino-5(6)-benzoylamino-isoindolenine, 1-amino-3-imino-5(6)-(methylcarbonyl)-isoindolenine, 1-amino-3-imino-5(6)-(phenyl-carbonyl)-isoindolenine, 1-amino-3-imino-5(6)-trifluoromethyl-isoindolenine, 1-amino-3-imino-5(6)-cyano-isoindolenine, 1-amino-3-imino-5(6)-methoxycarbonylisoindolenine, 1-amino-3-imino-5(6)-phenoxysulphonyl-isoindolenine, 1-amino-3-imino-5(6)-dimethylamino-carbonyl-isoindolenine, 1-amino-3-imino-5(6)-piperidyl-N-sulphonyl-isoindolenine, 1-amino-3-imino-5(6)-pyridyl-(3')-isoindolenine, 1-amino-3-imino-5(6)-[6'-methyl-benzothiazolyl-(2')]-isoindolenine, 1-amino-3-imino-4,5(6,7)-benzoisoindolenine, 1-amino-3-imino-5,6-benzo-isoindolenine, 1-amino-3-imino-4(7)-aza-isoindolenine, 1-amino-3-imino-4,7-diaza-isoindolenine, 1-amino-3-imino-4(7)-aza-5(6)-phenyl-isoindolenine, 1-amino-3-imino-4,7-diaza-5,6-dimethyl-isoindolenine, 1-amino-3-imino-4,7-diaza-5,6-diphenyl-isoindolenine, 1-amino-3-imino-4,7-dithia-4,5,6,7-tetrahydro-isoindolenine and compounds of the formulae:

The amino-imino compounds of the formula (IV) are obtained in known manner [cf. e.g. Angew. Chem. 68, 133 (1956) and 72, 963 (1960)], for example, by the base-catalysed addition of alkanols, such as methanol, on to o-dicarboxylic acid nitriles of the formula

and subsequent reaction with ammonia or by an urea-melt of the corresponding dicarboxylic acids.

Suitable o-dicarboxylic acid nitriles (VII) are: phthalodinitrile, 3-chloro-phthalodinitrile, 4-chloro-phthalodinitrile, 4,5-dichloro-phthalodinitrile, 4-methyl-phthalodinitrile, 4-cyclohexyl-phthalodinitrile, 4-tert.-butyl-phthalodinitrile, 4-phenyl-phthalodinitrile, 4-(naphthyl-2')-phthalodinitrile, 4-(pyridiyl-(3')-phthalodinitrile, 4-[6'-methyl-benzthiazolyl-(2')]-phthalodinitrile, 1,2,5,6-tetrahydrophthalodinitrile, 4-methyl-1,2,5,6-tetrahydro-phthalodinitrile, 4-methoxy-phthalodinitrile, 4-ethoxy-phthalodinitrile, 4-phenoxy-phthalodinitrile, 4-methyl-mercapto-phthalodinitrile, 4-benzylmercapto-phthalodinitrile, 4-phenylmercapto-phthalodinitrile, 4-methyl-sulphonyl-phthalodinitrile, 4-ethylsulphonyl-phthalodinitrile, 4-benzylsulphonyl-phthalodinitrile, 3-nitro-phthalodinitrile, 4-nitro-phthalodinitrile, 4-phenylsulphonyl-phthalodinitrile, 4-acetylamino-phthalodinitrile, 4-benzoylamino-phthalodinitrile, 3,4-dicyano-acetophenone, 3,4-dicyano-propiophenone, 3,4-dicyano-benzophenone, 3,4-dicyano-fluorenone, 1,2-dicyano-naphthalene, 2,3-dicyanonaphthalene, 4-trifluoromethyl-phthalodinitrile, 1,2,4-tricyano-benzene, 3,4-dicyano-benzoic acid ethyl ester, 3,4-dicyano-benzene-sulphonic acid phenyl ester, 3,4-dicyanobenzoic acid diethylamide, 3,4-dicyano-benzoic acid morpholide, 3,4-dicyano-benzoic acid pyrrolidide, 3,4-dicyano-benzene-sulphonic acid diethylamide, 3,4-dicyano-benzene-sulphonic acid morpholide, 2,3-dicyano-pyridine, 3,4-dicyano-pyridine, 2,3-dicyano-6-phenyl-pyridine, 3,4-dicyano-6-phenyl-

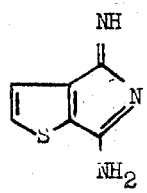 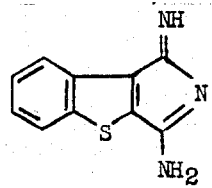 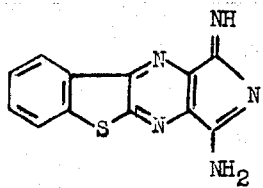

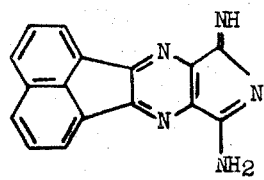 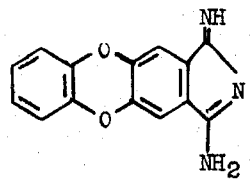 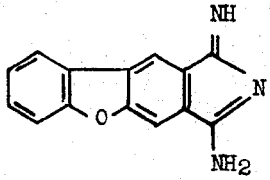

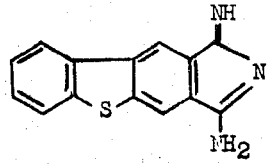

pyridine, 3,4-dicyano-6-phenyl-pyridine, 3,4-dicyano-2-methyl-6-phenyl-pyridine, 2,3-dicyano-quinoline, 2,3-dicyano-pyrazine, 2,3-dicyano-6-phenyl-pyrazine, 2,3-dicyano-5,6-dimethyl-pyrazine, 2,3-dicyano-5,6-diphenyl-pyrazine, 2,3-dicyano-thiophen, 2,3-dicyano-thionaphthene, 3,4-dicyano-diphenyloxide, 3,4-dicyanodiphenylsulphide, 4,5-dicyano-1-methyl-imidazole and compounds of the formulae

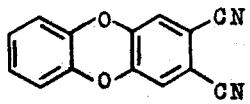 and 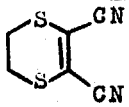

The thiocyanic acid salts of the amino-iminopyrrolenines of the formula (VI) required for the second variant of the process for the production of the aminothiodiazoles of the formula (I) according to the invention are obtained by reacting the fundamental free bases of the formula (IV) or alkoxy-imino compounds of the formula

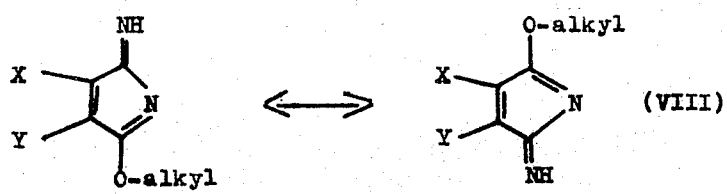

in which X and Y have the same meaning as above; and
alkyl stands for a $C_1$-$C_4$-alkyl radical, with $NH_4SCN$ in, for example, an alcoholic solution or suspension.

The alkoxy compounds of the formula (VIII) can be prepared, for example, according to the process described in German Pat. Specification No. 879,102.

This second process variant can likewise be carried out as a single-pot reaction, but after the reaction of (IV) with $NH_4SCN$ care must be taken to remove the liberated ammonia as completely as possible, in order to obviate its reaction with hypohalites.

A particularly advantageous method of carrying out the process for the production of the new aminothiodiazoles (I) according to the invention consists in the base catalysts are added in a single-pot reaction to solutions or suspensions of the dinitriles (VII) in an alcoholic solvent at 0° to 60°C, preferably at 15° to 40°C; when the reaction is completed [this is established according to an acidimetric process described in J. Org. Chem. 26,412 (1961)], approximately the equimolar amount of ammonium thiocyanate [referred to (VII)] is added at room temperature with stirring; if necessary, the mixture is boiled under reflux for some time, in order to complete the reaction; it is then cooled to −10° to 0°C; and the amount of hypohalite calculated for the formulation of the desired aminothiodiazole is added dropwise in an aqueous or organic solution.

Of course, the hypohalite solution can also be prepared in the reaction vessel itself in that the calculated amount of chlorine or bromine is allowed to act subsequently to the thiocyanate reaction and after the addition of one equivalent of alkali metal or alkaline earth metal hydroxide or alcoholate in an aqueous or alcoholic solution.

The new 5-amino-1,2,4-thiodiazoles of the formula (I) are colourless to yellow crystalline substances which are suitable, inter alia, for the production of valuable azo dyestuffs.

A further subject-matter of the present invention comprises azo dyestuffs of the general formula

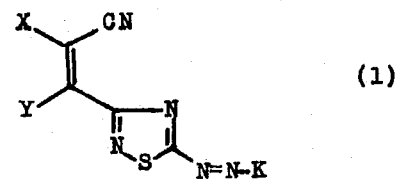

in which
X and Y, independently of one another, stand for alkyl, cycloalkyl, aralkyl or aryl radicals, and in which X and Y together may form the residual members of a fused aromatic-carbocyclic or aromatic-heterocyclic ring which may be partially hydrogenated; and
K represents the radical of a coupling component, as well as their production and their use for the dyeing and printing of synthetic organic materials.

(VIII)

Suitable aromatic-carbocyclic rings which may be partially hydrogenated are benzene, naphthalene, tetralin, indane, anthracene, phenanthrene and other rings, the benzene and naphthalene rings being particularly suitable.

These rings may contain further substituents, such as nitro, $CF_3$, alkyl, cycloalkyl, aralkyl, aryl, halogen, alkoxy, aryloxy, alkylcarbonyl, arylcarbonyl, alkylcarbonylamino, arylcarbonylamino, alkylsulphonylamino, aryl-sulphonylamino, alkyl-sulphonyl, aralkylsulphonyl, aryl-sulphonyl radicals and sulphamoyl and carbamoyl radicals which are preferably substituted by alkyl groups.

Suitable heterocyclic rings formed by X and Y together with the ethylene group are pyridine, quinoline, thiophen, thionaphthene, dibenzofuran and pyrazine rings, as well as, in particular,

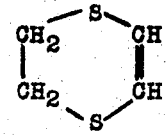

These rings, too, may carry further substituents such as, for example, $C_1$-$C_4$-alkyl radicals, halogen atoms, preferably chlorine, and optionally substituted phenyl radicals.

Suitable radicals K are, for example, radicals of coupling components of the benzene, naphthalene, pyrazole, acyl-acetic acid amide, pyrimidine, pyridine, thiazole, indole, imidazole, indazole and quinoline series which may carry non-ionic and/or cationic substituents, as well as radicals of enolisable aliphatic ketones.

The term "non-ionic substituents" refers to radicals commonly used in dyestuff chemistry, for example, $C_1$-$C_4$-alkyl, $C_1$-$C_4$-alkoxy, $C_2$-$C_5$-alkyl-carbonylamino, arylazo radicals and halogen atoms such as fluorine, chlorine and bromine.

Suitable cationic substituents are primarily ammonium groups.

Suitable arylazo radicals are primarily phenylazo radicals which may also carry non-ionic substituents.

A preferred group of azo dyestuffs within the scope of the formula (1) corresponds to the formula

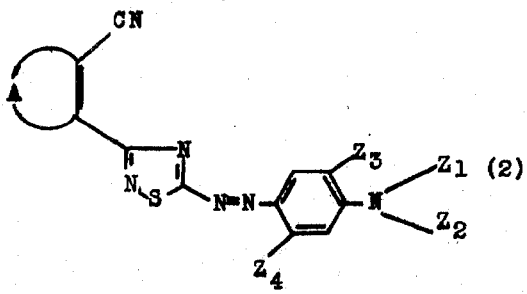

in which
Z₁ means hydrogen, alkyl or aralkyl;
Z₂ means Z₁ or aryl;
Z₃ means hydrogen, halogen, alkyl, alkoxy or aryloxy;
Z₄ means hydrogen, alkyl, alkoxy, cyano, halogen or acylamino; and
A stands for the radicals

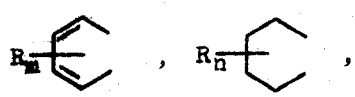

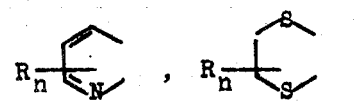

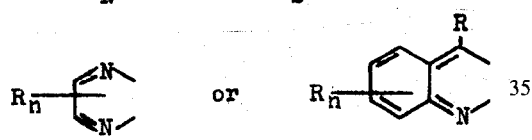

in which R means hydrogen, $C_1$-$C_4$-alkyl, phenyl, $CF_3$, halogen, nitro, $C_1$-$C_4$-alkyl-$SO_2$-, phenyl-$SO_2$- or $C_1$-$C_4$-alkoxy; m stands for 1, 2 or 3; and n stands for 1 or 2.

Suitable alkyl radicals $Z_1$ and $Z_2$ are $C_1$-$C_5$-alkyl radicals which may be substituted by —Cl, —NO₂, —CN, —OH,

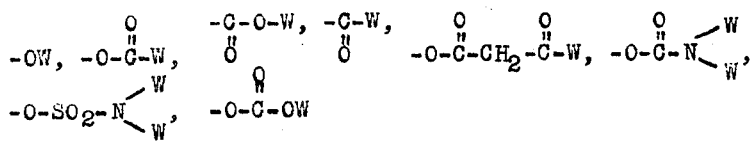

where W preferably stands for $C_1$-$C_2$-alkyl, phenyl or benzyl radicals, W' for H or $C_1$-$C_2$-alkyl.

Suitable substituents in the alkyl groups are, furthermore, ammonium groups such as the trimethyl ammonium, benzyl-dimethyl ammonium, allyl-dimethyl ammonium, pyridinium, imidazolium, triazolium and dimethyl hydrazinium groups.

Suitable aralkyl radicals $Z_1$ and $Z_2$ are benzyl- and phenylethyl radicals.

Suitable aryl radicals $Z_2$ are phenyl radicals which may be substituted by alkyl, alkoxy or halogen.

Suitable alkyl and alkoxy radicals $Z_3$ and $Z_4$ are methyl, ethyl, $CF_3$, methoxy and ethoxy.

Suitable aryloxy radicals $Z_3$ are optionally substituted phenoxy radicals.

Suitable acylamino radicals where the acyl portions are the formyl radical; $C_1$-$C_{12}$-alkylcarbonyl radicals which may be substituted in the alkyl radical by fluorine, chlorine, bromine, cyano, $C_1$-$C_4$-alkoxy, phenoxy or $C_1$-$C_4$-alkyl-carbonyloxy; aralkyl-carbonyl radicals such as benzyl-carbonyl; aryl-carbonyl radicals such as phenyl-carbonyl, tolyl-carbonyl, furyl-carbonyl, thienyl-carbonyl or pyridyl-carbonyl; methyl- and ethyl-sulphonyl radicals; aryl-sulphonyl radicals such as phenylsulphonyl or p-tolyl-sulphonyl; the radical of a carbonic acid monoester such as methoxy-carbonyl or phenoxy-carbonyl; the radical of a carbonic acid monoamide such as amino-carbonyl, dimethylamino-carbonyl, cyclohexylamino-carbonyl and phenylamino-carbonyl; as well as the radical of a sulphonic acid monoamide such as dimethylamino-sulphonyl.

Dyestuffs which are particularly preferred are those of the formula

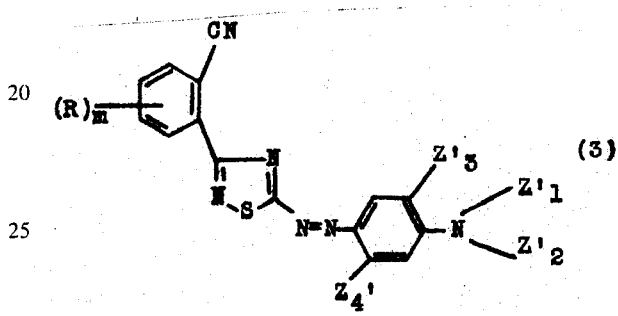

in which
R stands for hydrogen, methyl, phenyl, chlorine or methoxy, $NO_2$, $CH_3SO_2$-;
m stands for 1, 2 or 3;
$Z'_1$ and $Z'_2$, independently of one another, stand for hydrogen, methyl, ethyl, n-propyl, n-butyl, chloroethyl, cyanoethyl, hydroxyethyl, methylcarbonyloxyethyl, methoxycarbonyloxyethyl, ethoxycarbonyloxyethyl, methoxycarbonylethyl or ethoxycarbonylethyl;
$Z'_3$ stands for hydrogen, chlorine, methyl, methoxy, ethoxy or phenoxy; and
$Z_4$ stands for hydrogen, chlorine, methyl, methoxy, acetylamino or propionylamino,
those of the formula

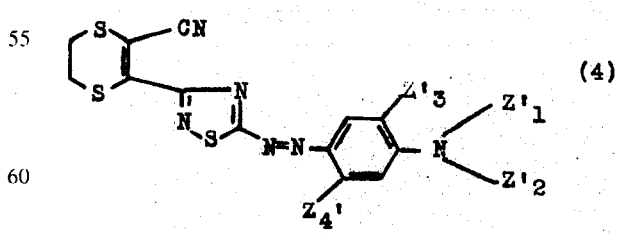

in which
$Z'_1$ to $Z'_4$ have the same meaning as above, as well as those of the formula (3) and (4) in which the group —$NZ'_1Z'_2$ is replaced with the radical

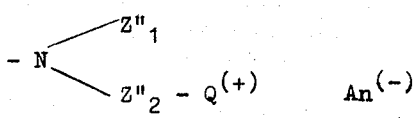

in which

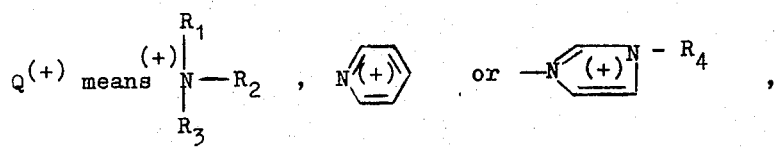

$Z''_1$, $R_1$, $R_2$ and $R_4$ stand for $C_1$-$C_4$-alkyl;
$Z''_2$ stands for $C_1$-$C_4$-alkylene;
$R_3$ stands for $C_1$-$C_4$-alkyl, benzyl, allyl or —$NH_2$;
$An^{(-)}$ means an anion such as $Cl^{(-)}$ or $Br^{(-)}$.

The new monoazo dyestuffs of the formula (1) are obtained by diazotising amines of the formula

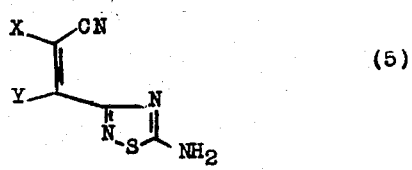

in which

X and Y have the same meaning as above, and combining the product with coupling components of the formula $$H - K \qquad (6)$$

in which

K has the same meaning as above.

Suitable amines (5) are those described in detail above.

Suitable coupling components are phenols, naphthols, aminobenzenes, aminonaphthalenes, acetoacetic ester anilides, pyrazolones and other heterocycles capable of coupling, as well as enolisable ketones.

From the series of enolisable keto compounds there may be mentioned, by way of example: acetylacetone, benzoylacetone, acetoacetic acid methyl or ethyl ester, acetoacetic acid anilide and its derivatives substituted in the anilide radical by methyl, methoxy and chlorine, as well as indandione and dimedone. Suitable phenols are phenol, o-, m- and p-cresol, salicylic acid methyl ester, resorcinol, 2-nitro-resorcinol, hydroquinone-mono-methyl or -ethyl ether, 1-hydroxy-4-(β-cyanoethyl)-benzene. Examples of naphthols are β-naphthol, 2,6-dihydroxy-naphthalene, 2-hydroxy-6-methoxy-naphthalene, 2-hydroxy-naphthalene-5-(or 6)-sulphonic acid diethylamide, 2-hydroxy-naphthalene-3-carboxylic acid methyl ester, 2-hydroxy-naphthalene-3-carboxylic acid anilide and its derivatives substituted in the anilide radical by methyl, methoxy, ethoxy or chlorine. Suitable aminobenzenes are: aniline, 3-methylaniline, 2-methoxy-5-methylaniline, 2,5-diethoxy-aniline, 3-acetylamino-1-amino-benzene, 2-methoxy-5-acetylamino-1-amino-benzene, 1-ethoxy-2-methyl-5-acetylaminobenzene, N-ethyl-aniline, N-n-butylaniline, N-(β-hydroxyethyl)-aniline, N-(β-methoxyethyl)-aniline, N-(β-cyanoethyl)-aniline, N-(β-carbomethoxyethyl)-aniline, N-(β-chloro-ethyl)-aniline, dimethylaniline, diethylaniline, N-ethyl-N-(benzyl- or β-phenylethyl)-aniline, N-n-butyl-N-(β-chloroethyl)-aniline, N-(methyl-, ethyl-, propyl- or butyl-)-N-(β-cyanoethyl)-aniline, N-ethyl-N-(β-hydroxyethyl)-aniline, N-n-butyl-N-(β-hydroxyethyl)-aniline, N-N-bis-(β-hydroxyethyl)-aniline, N-ethyl-N-(β-acetoxyethyl)-aniline, N-ethyl-N-(β-methoxy-ethyl)-aniline, N-(β-hydroxyethyl)-N-(β-cyanoethyl)-aniline, N-(β-acetoxyethyl)-N-(β-cyanoethyl)-aniline, N-N-bis-(β-acetoxyethyl)-aniline, N-ethyl-N-(β-hydroxy-γ-chloro-propyl)-aniline, N-ethyl-N-(β-hydroxy-γ-cyano-propyl)-aniline, N-ethyl-N-(β-γ-diacetoxy-propyl)-aniline, N,N-bis-(β-cyanoethyl)-aniline, N,N-bis-(ω-cyanoethoxyethyl)-aniline, N-ethyl-N-(ω-cyanoethoxyethyl)-aniline, N,N-bis-(β-methoxy-carabonyloxyethyl)-aniline, N-ethyl-3-methyl-aniline, N-(β-hydroxy-ethyl)-3-methyl-aniline, N-(β-cyanoethyl)-3-methylaniline, N-butyl-3-methyl-aniline, N-(β-carbomethoxyethyl)-3-methyl-aniline, N,N-diethyl-3-methyl-aniline, N-ethyl-N-(benzyl- or β-phenylethyl)-3-methyl-aniline, N-ethyl-N-(β-chloroethyl)-3-methyl-aniline, N-(ethyl- or butyl-)-N-(β-acetoacetoxyethyl)-3-methyl-aniline, N-(methyl-, ethyl- or benzyl)-N-(β-cyanoethyl)-3-methyl-aniline, N-(ethyl- or n-butyl)-N-(β-hydroxyethyl)-3-methyl-aniline, N,N-bis-(β-hydroxyethyl)-3-methyl-aniline, N-(ethyl- or n-butyl-)-N-(β-acetoxyethyl)-3-methyl-aniline, N-(β-hydroxyethyl)-N-(β-cyanoethyl)-3-methylaniline, N-ethyl-N-(β-hydroxy-γ-chloro-propyl)-3-methylaniline, N-ethyl-N-(β; γ-dihydroxy-propyl)-3-methyl-aniline, N,N-bis)β-acetoxy-ethyl)-3-methyl-aniline, N-ethyl-N-(β-carbomethoxyethyl)-3-methyl-aniline, N,N-bis-(β-methoxy-carbonyloxyethyl)-3-methyl-aniline, N-(β-acetoxyethyl)-N-(β-cyanoethyl)-3-methyl-aniline, N,N-bis-(β-cyanoethyl)-3-methylaniline, N-(ethyl- or n-butyl)-N-(β-phenoxyethyl)-aniline or 3-methyl-aniline, N-(β-cyanoethyl)-N-(β-phenoxyethyl)-aniline or 3-methyl-aniline, N,N-diethyl-3-chloro-aniline, N,N-bis-(β-hydroxyethyl)-3-chloroaniline, N,N-diethyl-3-methoxy-aniline, N,N-bis-(β-hydroxyethyl)-3-ethoxy-aniline, N-(β-cyanoethyl)-2-chloro-aniline, N,N-diethyl-3-trifluoromethyl-aniline, N,N-diethyl-3-cyano-aniline, [2-(N-ethyl-N-phenylamino)-ethyl]-trimethylammonium methylsulphate, [2-(N-ethyl-N-phenyl-amino)-ethyl]-benzyl-dimethylammonium chloride, [2-(N-ethyl-N-3'-methylphenyl-amino)-ethyl]-trimethylammonium methyl-sulphate, N-[2-(N'-ethyl-N'-phenyl-amino-ethyl]-pyridinium chloride, N,-N-dimethyl-3-acetylamino-aniline, N,N-diethyl-3-acetylaminoaniline, N-ethyl-N-(β-hydroxyethyl)-3-acetylamino-aniline, N,N-bis-(β-hydroxyethyl)-3-acetylamino-aniline, N,N-bis-(β-acetoxy-ethyl)-3-benzoylamino-aniline, N-ethyl-N-(β-cyanoethyl)-3-propionylamino-aniline, N,N-diethyl-3-(hydroxyacetylamino)-aniline, N,N-diethyl-3-(acetoxyacetylamino)-aniline, N,N-diethyl-3-(ethoxyacetylamino)-aniline, N,N-diethyl-3-(phenoxyacetylamino)-aniline, N,N-diethyl-3-(methylsulphonylamino)-aniline, N,N-diethyl-3-(phenylsulphonylamino)-aniline, N,N-dimethyl-3-(N'-methyl-N'-acetylamino)-aniline, 3-(N,N-diethyl-amino)-phenyl-urea, 3-[N,N-bis-(β-acetoxyethyl)-amino]-phenyl-N',N'-dimethyl-urea, N,N-diethyl-3-(methoxycarbonylamino)-aniline, N,N-dimethyl-3-(phenoxycarbonylamino)-aniline, N,N-diethyl-3-(β-chloropropionylamino)-aniline, N,N-diethyl-3-(dimethylaminosulphonylamino)-aniline, N,N-diethyl-2-methoxy-5-acetylamino-aniline, N,N-bis-(β-acetoxy-ethyl)-2-ethoxy-5-acetylamino-aniline, N,N-dimethyl-2-phenoxy-5-formylamino-aniline, N-(β-hydroxyethyl)-2-methyl-5-acetylamino-aniline, N,N-diethyl-2,5-dimethoxy-aniline, diphenylamine, N-(methyl- or ethyl)-diphenylamine, 3-acetylaminodiphenylamine, N-methyl-4-ethoxy-diphenylamine, N-(methyl- or ethyl)-N-(β-acetoxyethyl)-3-acetylaminoaniline, N-(methyl- or ethyl)-N-(β-carbomethoxyethyl)-3-acetylamino-aniline, N,N-diethyl-3-hydroxy-aniline.

Suitable coupling components from the series of amino-naphthalenes are, for example, 1- or 2-amino-naphthalene, 1-N-(β-hydroxyethyl)-amino-naphthalene, 1-phenylaminonaphthalene, 2-amino-8-hydroxy-naphthalene, 2-aminonaphthalene-5- or 6-sulphonic acid dimethylamide.

Further suitable coupling components are: indole, 2-methyl-indole, 2,5-dimethyl-indole, 2,4-dimethyl-7-methoxy-indole, 2-phenyl-indole, 2-phenyl-5-ethoxy-indole, 2-methyl-5-or 6-chloro-indole, 1,2-dimethyl-indole, 1-methyl-2-phenylindole, 2-methyl-5-nitro-indole, 2-methyl-5-carbomethoxy-indole, 2-methyl-indoline, 1,2,3,4-tetrahydroquinoline and its derivatives, such as N-ethyl-1,2,3,4-tetrahydro-quinoline, N-(β-hydroxyethyl)-1,2,3,4-tetrahydroquinoline, N-benzyl-1,2,3,4-tetrahydroquinoline, N-(β-acetoxyethyl)-1,2,3,4-tetrahydroquinoline, N-(β-cyanoethyl)-7-acetylamino-1,2,3,4-tetrahydroquinoline; pyrazolines such as e.g., 3-methyl-pyrazolone-(5), 1-phenyl-3-methyl-pyrazolone-(5), 1-(β-cyanoethyl)-3-methyl-pyrazolone-(5), 1,3-dimethylpyrazolone-(5), 1-(β-acetoxyethyl)-3-methyl-pyrazolone-(5), 1-(o-chlorophenyl)-3-methyl-pyrazolone-(5), 1-phenyl-3-carbomethoxy-pyrazolone-(5), 1-phenyl-5-amino-pyrazole, 1-(3-aminophenyl)-pyrazolone-(5), 1-(4-aminophenyl)-pyrazolone-(5), 3-methyl-pyrazolone-(5)-carboxylic acid-(1)-amidine, 1-phenyl-pyrazolone-(5)-carboxylic acid-(3)-amide, 2-methyl-4H-pyrazolo[2,3-a]-benzimidazole, [1-(3-thia-cyclopentyl)-3-methyl-pyrazolone-(5)-S-dioxide]; pyridines such as 2,6-dihydroxy-3-cyano-4-methyl-pyridine, N-(methyl-, ethyl- or phenyl)-6-hydroxy-3-cyano-pyridone-(2); quinolines such as 8-hydroxy-quinoline, 2,4-dihydroxy-quinoline, N-(methyl- or n-butyl)-4-hydroxy-quinolone-(2); pyrimidines such as barbituric acid or 2,6-bis-methylamino-4-phenyl-amino-pyrimidine, 2-ethylamino-4-phenylamino-6-phenoxy-pyrimidine, 2,4-bis-ethylamino-6-phenylamino-pyrimidine, imidazole, 4,5-dimethyl-imidazole, 4,5-diphenyl-imidazole, 4-methyl-imidazole, 4-phenyl-imidazole; thiazoles such as 2-hydroxy-4-[methyl- or phenyl]-thiazole, 2-methylamino-[4-methyl- or -phenyl]-thiazole, 2-(β-cyanoethylamino)-[4-methyl- or phenyl]-thiazole.

Instead of a homogeneous diazo component, there may be used a mixture of two or more of the diazo components according to the invention, and instead of a homogeneous coupling component, there may be used a mixture of two or more of the coupling components according to the invention.

The diazotisation of the diazo components (5) can be carried out, for example, in inorganic or organic acids with sodium nitrite or nitrosyl-sulphuric acid, preferably at −10 to + 10°C. The preferred inorganic acids are concentrated phosphoric or sulphuric acid, the preferred organic acids are glacial acetic acid and propionic acid, or mixtures of these acids.

Coupling can likewise be carried out in known manner, for example, in a neutral to acidic medium, optionally in the presence of sodium acetate or other buffer substances. The coupling component is preferably added as a solution in phosphoric acid, sulphuric acid, glacial acetic acid or propionic acid or in mixtures of these acids, or as a solution in an organic water-miscible solvent such as e.g., methanol, ethanol, n- or i-propanol, ethylene glycol, ethylene glycol monoalkyl ethers, dioxan, tetrahydrofuran or sulpholane, to a solution of the diazo compound at about 0°C with cooling. After about 0.5 to 2 hours, the coupling mixture is poured into ice-water and the reaction is completed by the addition of a base such as sodium acetate or sodium hydroxide.

The coupling can also be carried out by combining the components in a mixing nozzle. This term refers to a device which permits of mixing the solutions of the diazo component, on the one hand, and the coupling component, on the other hand, in a comparatively small space. At least one of the two solutions, is passed through a nozzle, preferably under increased pressure. The mixture of the liquids is expediently poured immediately into ice water while stirring and, if necessary, the coupling is completed by raising the pH value.

Those dyestuffs of the formula (1) in which K contains an arylazo group, are obtained by diazotising monoazo dyestuffs of the formula

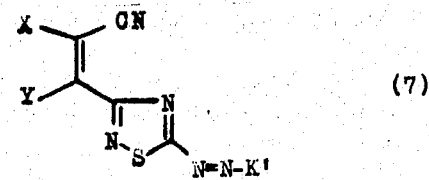

(7)

in which
X and Y have the same meaning as above; and
K' stands for the radical of a coupling component containing a diazotisable amino group,
and coupling the product with a suitable coupling component such as a phenol or naphthol.

The monoazo dyestuffs of the formula (7) are obtained by coupling diazotisable amines of the formula (5) with arylamines of the formula Ar-NH₂ such as, for example, aniline, naphthylamine-1,3-toluidine, 2,5-dimethoxy-aniline, and others.

The new water-insoluble dyestuffs, their mixtures with one another, and their mixtures with other dyestuffs are eminently suitable, especially in finely divided form, for the dyeing of synthetic fibres and fabrics of, for example, polypropylene, especially polypropylene modified with metals, such as e.g., nickel; cellulose tri- and 2½-acetate; polyurethanes; and, in particular, polyamides such as e.g., polycaprolactam, polyhexamethylene-diamine adipate, or poly-ε-amino-undecanoic acid; as well as aromatic polyesters such as polyethylene terephthalate and poly-1,4-cyclohexanedimethylene terephthalate. The dyestuffs according to the invention which contain an ammonium group in the molecule are particularly suitable for the dyeing of fibres and fabrics of polyacrylonitrile or of copolymers of acrylonitrile and other vinyl compounds such as acrylic esters, acrylamides, vinyl chloride, vinylidene chloride and vinyl-pyridine, or of copolymers of dicyano-ethylene and vinyl acetate, as well as for the dyeing of acid-modified polypropylene, polyester or polyamide fibres.

For dyeing from an aqueous bath, the water-insoluble dyestuffs are expediently used in dispersed form. Suitable dispersing agents are, for example, sulphite cellulose waste liquor, dinaphthyl-methane-sulphonate, or condensation products of cresol, 2-naphthol-6-sulphonic acid and formaldehyde. Other dispersing and/or wetting agents may be added to the dyebath.

When aromatic polyester fibres or triacetate fibres are dyed at temperatures of up to 105°C, it is generally advantageous to add conventional carrier substances in order to attain good dyestuff yields.

The dyeing of polyester materials with the dyestuffs according to the invention can also be carried out according to the known thermofixing process.

For dyeing metal-modified polyolefine fibres, those dyestuffs of the formula (1) are particularly suitable which carry in the coupling component in the o-position to the azo group a group capable of forming a chelate, for example, a OH-, $NH_2$- or NH-group.

The new water-insoluble dyestuffs can also be used for the spin-dyeing of polyamides, polyesters, polyurethanes and polyolefines.

Printing is likewise carried out in known manner. For this purpose there is used, for example, a printing colour containing, in addition to the dyestuff, the auxiliaries conventionally used in printing, and this printing colour is applied to the materials to be printed and fixed by a subsequent heat treatment.

The dyeings and prints so obtained are characterised by good general fastness properties.

Compared with the most closely comparable dyestuffs of German Pat. Specification 927,944 and of Deutsche Offenlegungsschrift (German Published Specification) 1,909,107, the dyeings with the dyestuffs prepared according to the invention on polyester materials, such as cellulose tri- and 2½-acetate as well as polyethyleneterephthalate, are distinguished in particular by a better fastness to sublimation.

The dyestuffs with an ammonium group in the coupling component obtained according to the present process preferably contain, an anion, the radical of a strong acid, for example, sulphuric acid or its semiester, or of an aryl-sulphonic acid, of phosphoric acid, or a halogen ion. The above anions which have been introduced into the dyestuffs molecule according to the present process may be replaced with anions of other acids, e.g. of organic acids such as formic acid, acetic acid, lactic acic or tartaric acid. The dyestuff salts may also be used in the form of double salts, especially with zinc chloride.

Dyeing of polyacrylonitrile, copolymers of acylonitrile and of acid-modified polyolefins, polyamide and polyester materials with dyestuffs containing ammonium groups is generally carried out in an aqueous, neutral or acidic medium at boiling temperature under atmospheric pressure, or in a closed vessel at elevated temperature and under increased pressure. Commercial levelling agents may be used.

Water-insoluble dyestuffs of the general formula (1) which contain one or more alkyl radicals with 4 – 12 carbon atoms are in many cases suitable for dyeing synthetic fibre materials from organic solvents. The process is characterised in that the fibre materials are impregnated with dyeing liquors containing these dyestuffs and are subsequently subjected to a heat treatment.

Example 1(a):

Preparation of N-chloro-diimino-phthalimide.

58.4 g 1-amino-3-imino-isoindolenine are dissolved in 400 ml of ice-water with the addition of 4 g acetic acid. 102.8 ml of a sodium hypochlorite solution containing 150 g/litre of active chlorine are added thereto dropwise at 0° – 5°C within about 60 minutes. Stirring is continued for 2 hours, the pH is adjusted to 7 – 8 by means of acetic acid, the precipitate is filtered off and thoroughly washed with water. For purification, the product is stirred once or several times with methanol in order to remove any adhering starting material. After drying at room temperature in a vacuum, there is obtained a white powder which melts at 310° – 315°C with decomposition, eliminates iodine from an acetic acid potassium iodide solution, and the NMR-spectra of which indicate the following constitution:

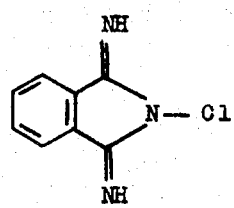

Yield appr. 90%.

When this compound is dissolved hot in concentrated acetic acid, a colourless substance of melting point 222° – 223°C crystallises upon cooling; according to elementary analysis, mixed melting point and IR-spectrum, it is identical with the compound of the formula

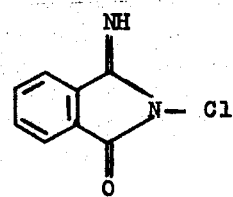

described in the report of Gesellschaft Deutscher Chemiker No. 40, 2709 seq.

Example 2(a):

Preparation of N-bromo-diimino-phthalimide.

37 g bromine are added at about 0°C within about 20 minutes to a solution of 24 g sodium hydroxide in 250 ml icewater. 29.2 g 1-amino-3-imino-isoindolenine are subsequently introduced, with the simultaneous addition of ice, at 0°–5°C. Almost complete dissolution occurs at first, and after about 15 minutes an almost colourless precipitate begins to separate. Stirring is continued for 2 – 3 hours at 0° – 10°C, the precipitate is filtered off with suction, thoroughly washed with water and then with methanol, and dried at room temperature in a vacuum. The product melts at about 330°C with decomposition. It is sparingly soluble in water, methanol, ethanol, acetone, benzene and dichlorobenzene, more readily soluble in pyridine, dimethyl formamide, dimethyl sulphoxide and N-methyl-pyrrolidone and corresponds to the formula

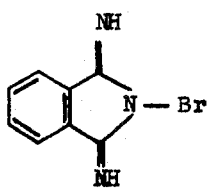

Yield: about 85%.

When the compound so obtained is heated with a solution of potassium hydroxide in methanol until a sample no longer causes KI-starch paper which has been moistened with acetic acid to turn blue, 2-aminobenzoic acid and its methyl ester can be detected in the reaction mixture by means of thin layer chromatography in that the substances are diazotised on the plate and converted into the azo dyestuffs by spraying them with a methanolic β-naphthol-solution.

Example 3(a):

Preparation of 4-methoxy-diimino-N-bromophthalimide 35.2 g 1-amino-3-imino-5-(6)-methoxy-isoindolenine are stirred in 350 ml methanol, and a solution of 24.6 g potassium hydroxide in 125 ml methanol is added at 0° - 5°C. 33.6 g bromine are added at about −10° to 0°C dropwise in about 30 minutes while externally cooling with ice/sodium chloride, and stirring is continued at 0° - 5°C for 2 - 3 hours. The grey-green precipitate is filtered off with suction, washed first with water, then with methanol, and dried at room temperature in a vacuum. As crude product the 4-methoxy-diimino-N-bromo-phthalimide melts at 244° - 246°C. After recrystallisation from pyridine, the melting point is 250° - 251°C.

The corresponding N-chloro compound can be prepared in the following way:

35.2 g 1-amino-3-imino-5-(6)-methoxy-isoindolenine are stirred in 300 ml isopropanol and 12.5 ml tert.-butyl hypochlorite are slowly added dropwise at room temperature. The precipitate is filtered off with suction after stirring over night, washed with methanol and dried in a vacuum. The N-chloro compound is obtained in the form of a grey-green powder which melts at about 250°C with decomposition.

Example 4(a):

Preparation of 4-phenyl-diimino-N-bromophthalimide.

When 44.4 g of 1-amino-3-imino-5-(6)-phenyl-isoindolenine are used in Example 3(a) as starting material, then the corresponding N-bromo compound of melting point 209° - 211°C (from pyridine) is obtained in the form of a yellowish powder.

Example 5(a):

Preparation of

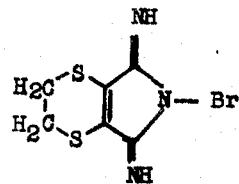

When the starting material is replaced in Example 3(a) with 32.2 g 1-amino-3-imino-4,7-dithia-4,5,6,7-tetrahydroisoindolenine, the mixture, after the addition of bromine, is clarified, with active charcoal and the pH adjusted to 7 - 8, then the corresponding N-bromo compound of the formula

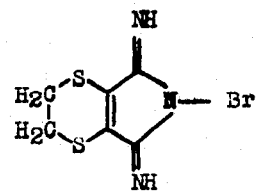

of decomposition point 166° - 167°C is again obtained in the form of a yellow powder.

Example 6(a):

Preparation of

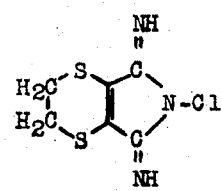

32.2 g 1-amino-3-imino-4,7-dithia-4,5,6,7-tetrahydro-insoindolenine are stirred at 0° - 5°C in 150 ml hexamethyl-phosphoric acid-bis-dimethylamide, and 51.4 ml of a sodium hypochlorite solution containing 150 g/litre of active chlorine are added at the same temperature within about 1 hour. Stirring is continued at 0° - 5°C for a further 3 hours, the solution is poured into 300 g of ice-water, and the N-chloro compound formed is precipitated by neutralisation with acetic acid. After stirring in methanol and drying in a vacuum at room temperature, there is obtained a yellow powder of decomposition point 180°C.

As solvents in the present Example there may also be used dimethyl formamide, dimethyl acetamide, N-methylpyrrolidone, tetramethylene-sulphone, pyridine, or mixtures of these solvents. The hypochlorite solution used in the present Example may be replaced with an aqueous solution of the equivalent amount of calcium hypochlorite.

The following Table I contains further N-chloro- or N-bromo compounds which can be prepared according to the process of Examples 1(a) to 6(a) from the corresponding aminoimino compounds:

Table I

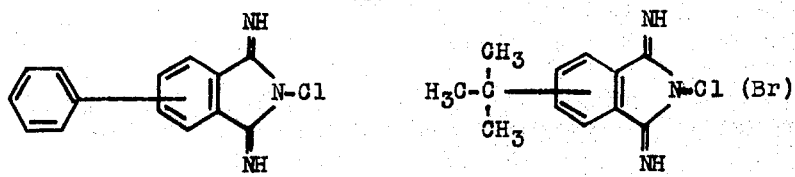

Table I—Continued
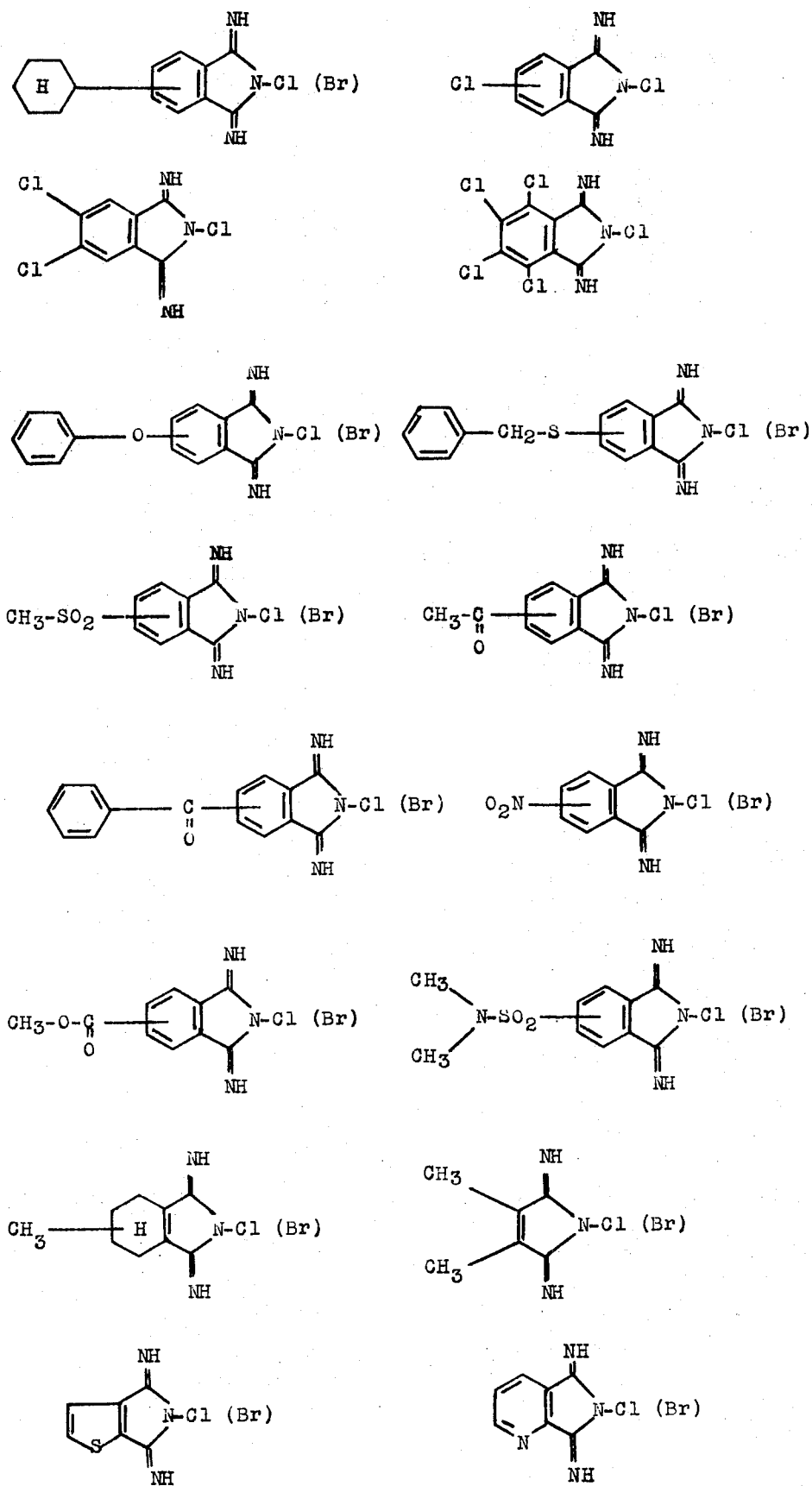

Table 1—Continued

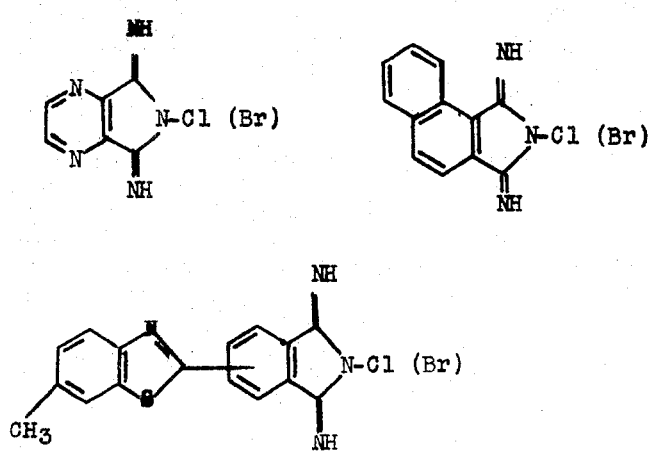

Example 7 (a):

Preparation of the thiocyanic acid salts of the general formula (VI)

Method (A):

0.5 mol 1-amino-3-imino-isoindolenine are dissolved in 500 ml methanol, and 0.5 mol ammonium thiocyanate are added at room temperature. The thiocyanate separates already after a short time as a yellow precipitate with the evolution of ammonia. The mixture is stirred at room temperature for about 2 hours and if desired, the reaction is completed by gentle heating. The precipitate is filtered off with suction, washed first with methanol, then with ether, and dried in a vacuum. The resultant product melts at 250°–255°C with decomposition.

In an analogous way there are obtained, for example, the thiocyanic acid salts of the corresponding 5-(6)-methoxy compound, melting point 247° – 249°C; and of the 5-(6)-phenyl compound, melting point 246° – 248°C.

Method (B):

0.5 mol phthalodinitrile are stirred in 500 ml methanol, and 2.7 g sodium methylate are added. The phthalodinitrile has dissolved after about 1.5 hours. The mixture is stirred at room temperature for 6 – 8 hours, and 0.5 mol ammonium thiocyanate are then added. Already after a short time, there begins the formation of a yellowish precipitate which is filtered off with suction after stirring over night. Also in this case, the reaction mixture may be heated for a short time in order to complete the reaction.

The sodium methylate used in the present Example as catalyst can be replaced with other alkali metal or alkaline earth metal alcoholates, such as sodium ethylate, potassium tert.-butylate, calcium ethylate, or with organic bases such as e.g., trimethylbenzyl ammonium hydroxide.

If the phthalodinitrile is replaced with other o-dicarboxylic acid nitriles of the general formula (V), it is expedient to establish the optimal amounts of catalyst and optional reaction times by preliminary experiments. For observing this reaction, the process described by Schaefer and Peter, J. Org. Chem. 26, 412 (1961), where the degree of conversion is determined acidimetrically has proved satisfactory.

As a rule, the reaction times will be longer when the phthalodinitriles contain, for example, substituents with the properties of electron donators, such as 4-alkoxy or 4-alkylthio groups. On the other hand, some phthalodinitriles containing electron acceptors as substituents, such as 4-nitro, 4-carboxylic ester or 4-alkyl- or arylsulphonyl groups, react substantially faster. Dicyano-pyridines and dicyano-pyrazines are also highly reactive.

If the 0.5 mol phthalodinitrile are replaced in Example 7(a), Method (B), with 0.5 mol 4-methoxy-phthalodinitrile, the reaction with methanol/sodium methylate requires about 40 hours, whereas only about 2 hours are necessary when 0.5 mol 2,3-dicyano-pyridine are used.

Example 8(a):

Preparation of 5-amino-3-(2'-cyanophenyl)-1,2,4-thiodiazole 22.5 g of the N-bromo-diimino-phthalimide prepared in Example 2(a) are suspended in 200 ml methanol, and 7.6 g ammonium thiocyanate are added. A thick crystal slurry is formed in an exothermic reaction. The mixture is subsequently heated at boiling temperature under reflux for about 30 minutes in order to complete the reaction, the precipitate is filtered off with suction after cooling, and washed with water until free from salt. After drying, there is obtained an almost colourless powder of melting point 239° – 240°C; yield about 17 g (85 percent of theory). The substance is sufficiently pure for most purposes, for example, for the preparation of azo dyestuffs. If a higher degree of purity is required, it can be recrystallised, for example, from pyridine. The analytically pure product melts at 240°C.

($C_9H_6N_4S$ (202))

Calc. C: 53.5; H: 3.0; N: 27.7; S: 15.8
Found: C: 53.4; H: 2.9; N: 27.7; S: 15.9

The IR-spectrum shows a marked CN-band at 4.5 $\mu$.

The solvent methanol used in the present Example may be replaced, for example, with other alcohols such as ethanol, i-propanol or ethyl glycol, or with pyridine, dimethyl formamide, N-methyl-pyrrolidone or tetramethyl-sulphone. The reaction product may be precipitated with water. Sodium, potassium, calcium or barium thiocyanate are suitable to replace ammonium thiocyanate. The N-bromo compound can be replaced with equimolar amounts of the N-chloro compound of Example 1(a).

Example 9(a):

Preparation of 5-amino-3-(2'-cyanophenyl)-1,2,4-thiodiazole in a single-pot process 0.5 mol phthalodinitrile are converted in the thiocyanic acid salt of 1-amino-3-imino-isoindolenine in analogy with Example 7(a), Method (B). Without intermediate isolation of the product, the reaction mixture is cooled to −10° to −5°C, and 80 g bromine and a solution of 54 g sodium methylate in 400 ml methanol are simultaneously added from 2 dropping funnels at not more than 0°C within about 2 hours with intense stirring. Stirring is continued at about 0°C for a further 2 hours, the precipitate is filtered off with suction and washed first with methanol, then with water. The 5-amino-3-(2'-cyanophenyl)-1,2,4-thiodiazole described in Example 8(a) is obtained in a good yield (appr. 70 percent) and with a high degree of purity.

Example 10(a):

Preparation of 5-amino-3-(2'-cyano-4'(5')-methoxyphenyl)-1,2,4-thiodiazole
Method (A):

25.5 g N-bromo-4-methoxy-diimino-phthalimide (Example 3a) are stirred in 200 ml ethanol and, after the addition of 9.7 g potassium thiocyanate, heated at boiling temperature under reflux for 30 minutes. After cooling to room temperature, the precipitate is filtered off with suction and washed with water until free from salt. Yield about 90 percent. The almost colourless product can be recrystallised from benzene/pyridine (1:2) for purification and then melts at 236° − 238°C.
$C_{10}H_8N_4OS$ (232)

Calc. C: 51.7; H: 3.4; N: 24.2; O: 6.9; S: 13.8
Found: C: 51.7; H: 3.4; N: 23.9; O. 7.3; S: 13.8

The IR-spectrum shows a marked CN-band at 4.5 μ.

Equally good results are obtained with the use of the equivalent amount of N-chloro-4-methoxy-diiminophthalimide.

Method (B):

23.4 g 5-(6)-methoxy-1-amino-3-imino-isoindolenine hydrogen thiocyanate in 200 ml methanol are cooled to about −10°C, and 16 g bromine and a solution of 10.8 g sodium methylate in 100 ml methanol are simultaneously added to this suspension from 2 dropping funnels at not more than 0°C and with intense stirring. After stirring at about 0°C for 2 hours, the precipitate is filtered off with suction, washed first with methanol, then with water, and dried. After recrystallisation from benzene/pyridine, there are obtained almost colourless crystals which are identical with the product obtained according to Method (A).

Example 12(a):

Preparation of 5-amino-3-(2'-cyano-4'-(5)'-phenylphenyl)-1,2,4-thiodiazole 30.0 g N-bromo-4-phenyl-diimino-phthalimide (Example 4a) are reacted in 200 ml methanol with 11.4 g calcium thiocyanate tetrahydrate in analogy with Example 9(a). There results a yellow precipitate which, after washing with water and drying, can be recrystallised from benzene/pyridine. Melting point 225° − 228°C. (Yield appr. 75 percent of theory).
$C_{15}H_{10}N_4S$ (278)

Calc. C: 64.7; H: 3.6; N: 20.1; S: 11.5
Found: C: 64.7; H: 3.8; N: 20.0; S: 11.6

The IR-spectrum shows a CN-band at 4.5 μ.

If the N-bromo-4-phenyl-diimino-phthalimide is replaced in the present Example with 26.4 g of the compound of the formula

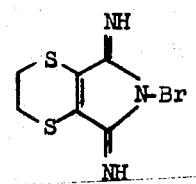

prepared according to Example 5(a), then a thiodiazole of the formula

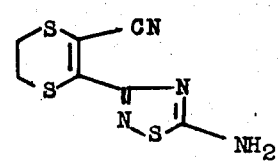

is obtained with a yield of about 80 percent in the form of a yellow powder which melts at 223° − 224°C after recrystallisation from benzene/pyridine:
$C_7H_6N_4S_3$ (242)

Calc. C: 34.7; H: 2.5; N: 23.1; S: 39.7
Found: C: 35.2; H: 2.8; N: 23.1; S: 39.4

The IR-spectrum shows a CN-band at 4.55 μ.

The corresponding N-chloro compounds can also be used in these Examples with good results.

Further 5-amino-1,2,4-thiodiazoles of the general formula (I) which can be prepared according to the instructions of Example 8(a) from the corresponding N-halogen compounds and/or according to Example 7(a)/9(a) from the corresponding o-dicarboxylic acid dinitriles, are assembled in the following Table II:

Table II

| Ser. No. | Formula |
|---|---|
| 1 | 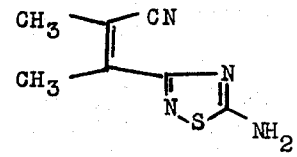 |

Table II—Continued
| Ser. No. | Formula |
|---|---|
| 2 | 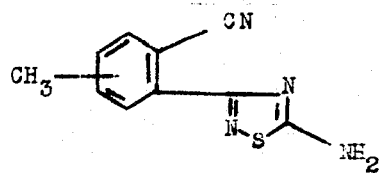 |
| 3 | 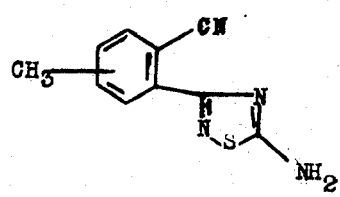 |
| 4 | 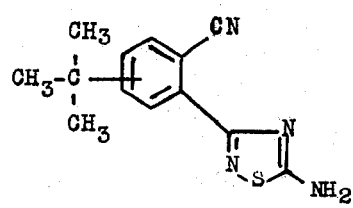 |
| 5 | 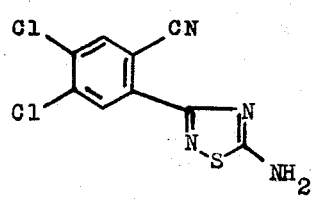 |
| 6 | 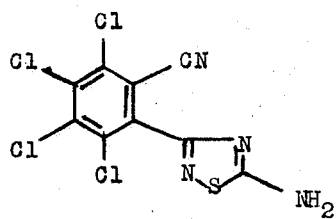 |
| 7 | 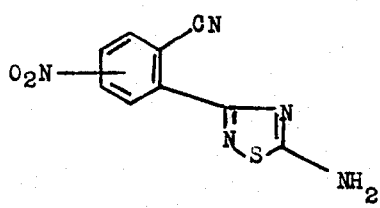 |
| 8 | 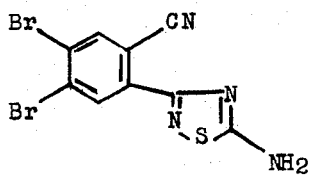 |

Table II—Continued
| Ser. No. | Formula |
|---|---|
| 9 | 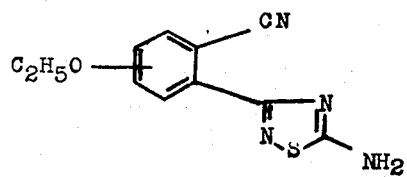 |
| 10 | 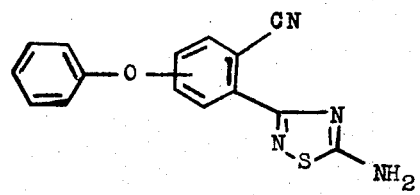 |
| 11 | 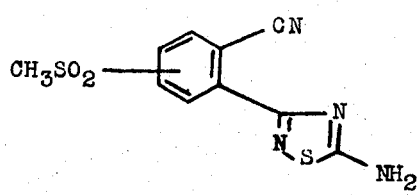 |
| 12 | 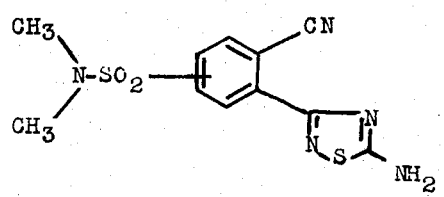 |
| 13 | 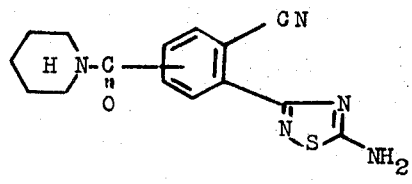 |
| 14 | 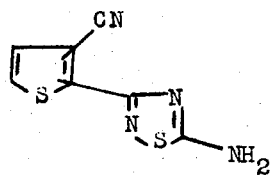 |
| 15 | 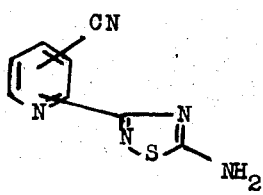 |

Table II—Continued

| Ser. No. | Formula |
|---|---|
| 16 | 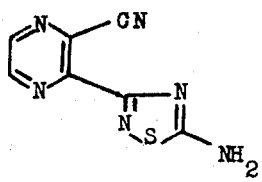 |
| 17 | 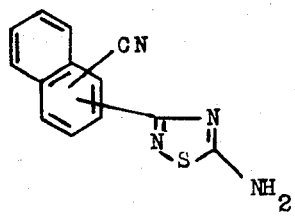 |

Example 1(b):

8.8 g 5-amino-3-(2'-cyanophenyl)-1,2,4-thiodiazole are added at about 0° – 10°C with stirring to a mixture of 60 ml of 85 percent ortho-phosphoric acid and 20 ml glacial acetic acid. 7.5 ml of 41.2 percent nitrosylsulphuric acid are added at −5° to −2°C within about 30 minutes, and the mixture is subsequently stirred at not more than 0°C for 4 hours. 0.5 g urea are then added, and stirring is continued at 0°C for 30 minutes. A solution of 8 g N-ethyl-N-(p-cyanoethyl)-aniline in 30 ml glacial acetic acid is poured to the resultant diazo solution at −5 to 0°C within 30 – 60 minutes. After a further 30 minutes, the reaction mixture is poured on to 200 g of ice while stirring, whereupon the dyestuff of the formula

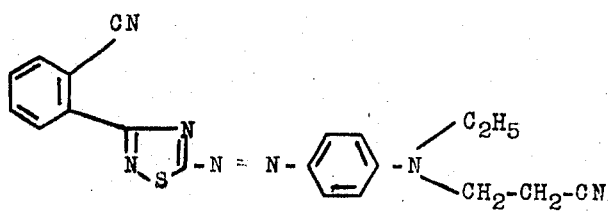

separates in the form of a red precipitate. The mixture is diluted with ice and water to a volume of 600 – 800 ml in all, the dyestuff is filtered off with suction and washed with water until neutral. It dyes polyester and polyamide fibres in yellowish red shades of good fastness properties, especially good fastness to sublimation.

Valuable dyestuffs are also obtained in an analogous way, when the diazonium salt of 5-amino-3-(2'-cyanophenyl)-1,2,4-thiodiazole prepared in the present Example is coupled with the coupling components listed in Column A of the following Table. The dyestuffs dye polyester and polyamide fibres in the shades given in Column B.

| No. | A | B |
|---|---|---|
| 1 | N-ethyl-N-(β-cyanoethyl)-3-methylaniline | red |
| 2 | N,N-diethyl-aniline | bluish red |
| 3 | N-(β-cyanoethyl)-aniline | yellowish red |
| 4 | N-(β-cyanoethyl)-2-methyl-aniline | yellowish red |
| 5 | N-(β-cyanoethyl)-2,5-dimethyl-aniline | red |
| 6 | N-(β-cyanoethyl)-2-chloro-aniline | yellowish red |
| 7 | N-(β-cyanoethyl)-2-methoxy-aniline | red |
| 8 | N-(β-cyanoethyl-2-methoxy-5-methyl-aniline | red |
| 9 | N-butyl-N-(β-chloroethyl)-aniline | bluish red |
| 10 | N-ethyl-N-(β-chloroethyl)-3-methyl-aniline | blue-red |
| 11 | N-ethyl-N-benzyl-aniline | red |
| 12 | N-ethyl-N-(β-phenylethyl)-aniline | red |
| 13 | N-(β-hydroxyethyl)-aniline | bluish red |
| 14 | N-butyl-N-(β-hydroxyethyl)-aniline | bluish red |
| 15 | N,N-bis-(β-hydroxyethyl)-3-methyl-aniline | blue-red |
| 16 | N-(β-hydroxyethyl)-N-(β-cyanoethyl)-aniline | yellowish red |
| 17 | N-(β-acetoxyethyl)-N-(β-cyanoethyl)-aniline | yellowish red |
| 18 | N,N-bis-(β-acetoxyethyl)-3-methyl-aniline | red |
| 19 | N,N-bis-(β-methoxycarbonyloxyethyl)-aniline | yellowish red |
| 20 | N-(β-carbomethoxyethyl)-aniline | red |
| 21 | N-(β-carbomethoxyethyl)-N-(β-cyanoethyl)-aniline | yellowish red |

—Continued

| No. | A | B |
|---|---|---|
| 22 | N-ethyl-N-(β-γ-dihydroxy-propyl)-aniline | bluish red |
| 23 | N-ethyl-N-(β-hydroxy-γ-cyano-propyl)-aniline | bluish red |
| 24 | N-ethyl-N-(ω-cyanoethoxyethyl)-aniline | bluish red |
| 25 | N,N-bis-(β-hydroxyethyl)-3-chloro-aniline | bluish red |
| 26 | N-ethyl-N-β-(phthalimidoethyl)-aniline | bluish red |
| 27 | N-ethyl-N-(β-benzoyloxyethyl)-3-methoxy-aniline | blue-red |
| 28 | N-methyl-N-(β-phenylacetoxyethyl)-3-methyl-aniline | bluish red |
| 29 | N-propyl-N-(β-phenoxyethyl)-aniline | bluish red |
| 30 | N-(β-methoxyethyl)-N-(β-cyanoethyl)-3-methyl-aniline | bluish red |
| 31 | N-butyl-N-(β-phenylsulphonylethyl)-3-methyl-aniline | bluish red |
| 32 | N,N-bis-(β-cyanoethyl)-3-methyl-aniline | yellowish red |
| 33 | N-ethyl-N-(β-acetoxy-γ-chloro-propyl)-3-methyl-aniline | bluish red |
| 34 | N-(β-hydroxyethyl)-3-methyl-aniline | blue-red |
| 35 | N-(4'-chlorobenzyl)-N-(β-cyanoethyl)-3-ethyl-aniline | red |
| 36 | N,N-diethyl-3-ethoxy-aniline | blue-red |
| 37 | N,N-diethyl-3-trifluoromethyl-aniline | bluish red |
| 38 | N,N-diethyl-3-cyano-aniline | red |
| 39 | N,N-diethyl-3-chloro-aniline | bluish red |
| 40 | N,N-diethyl-3-acetylamino-aniline | blue-red |
| 41 | N,N-dimethyl-3-formylamino-aniline | blue-red |
| 42 | N-ethyl-N-(β-hydroxyethyl)-3-acetyl-amino-aniline | blue-red |
| 43 | N-ethyl-N-(β-benzoyloxyethyl)-3-propionyl amino-aniline | red |
| 44 | N-methyl-N-(β-carbomethoxyethyl)-3-acetyl-amino-aniline | red |
| 45 | N-methyl-N-(β-cyanoethyl)-3-acetylamino-aniline | red |
| 46 | N,N-diethyl-3-(hydroxyacetylamino)-aniline | blue-red |
| 47 | N,N-bis-(β-acetoxyethyl)-3-(benzoylamino)-aniline | red |
| 48 | N,N-bis-(β-methoxycarbonyloxyethyl)-3-acetylamino-aniline | red |
| 49 | N,N-bis-(β-hydroxyethyl)-3-[thienyl-(2')]-carbonylamino)-aniline | blue-red |
| 50 | N,N-diethyl-3-(acetoxyacetylamino)-aniline | blue-red |
| 51 | N,N-diethyl-3-(methylsulphonylamino)-aniline | red |
| 52 | N,N-diethyl-3-(ethoxyacetylamino)-aniline | blue-red |
| 53 | N,N-dibutyl-3-(β-chloropropionylamino)-aniline | blue-red |
| 54 | N,N-dimethyl-3-(α-β-dibromo-propionylamino)-aniline | blue-red |
| 55 | N,N-diethyl-3-(ethoxycarbonylamino)-aniline | blue-red |
| 56 | N,N-bis-(β-acetoxyethyl)-3-(phenoxycarbonyl-amino)-aniline | blue-red |
| 57 | 3-(diethylamino)-phenyl urea | blue-red |
| 58 | N-(3-diethylaminophenyl)-N',N'-dimethyl-urea | blue-red |
| 59 | N-(β-hydroxyethyl)-2-methyl-5-acetylamino-aniline | blue-red |
| 60 | N,N-dimethyl-2-phenoxy-5-propionylamino-aniline | red-violet |
| 61 | N,N-diethyl-3-(dimethylaminosulphonylamino)-aniline | blue-red |
| 62 | N,N-dipropyl-2-methoxy-5-(3'-chlorobenzoyl-amino)-aniline | violet |
| 63 | N,N-bis-(β-hydroxyethyl)-2-ethoxy-5-acet-amino-aniline | violet |
| 64 | N,N-bis-(β-propionyloxyethyl)-2-methoxy-5-propionylamino-aniline | red-violet |
| 65 | N,N-bis-(β-methoxycarbonyloxyethyl)-2-methoxy-5-methoxycarbonylamino-aniline | red-violet |
| 66 | N,N-diethyl-2,5-dimethoxy-aniline | red violet |
| 67 | N-(β-carbomethoxyethyl)-3-acetamino-aniline | red |
| 68 | N-(β-cyanoethyl)-3-propionylamino-aniline | red |
| 69 | N-(β-hydroxyethyl)-diphenylamine | red |
| 70 | N-methyl-diphenylamine | red |
| 71 | 3-acetamino-N-ethyl-diphenylamine | bluish red |
| 72 | N-ethyl-4-ethoxy-diphenylamine | bluish red |
| 73 | N-(β-hydroxyethyl)-1,2,3,4-tetrahydro-quinoline | red |
| 74 | N-(β-benzoyloxyethyl)-1,2,3,4-tetrahydro-quinoline | red |
| 75 | N-benzyl-1,2,3,4-tetrahydroquinoline | red |
| 76 | N-(β-phenylethyl)-7-acetamino-1,2,3,4-tetrahydroquinoline | blue-red |
| 77 | 1-(β-hydroxyethylamino)-naphthalene | blue-grey |
| 78 | 1-diethylamino-naphthalene | blue-grey |
| 79 | 1-(4'-ethoxy-phenylamino)-naphthalene | grey-green |
| 80 | 1-phenyl-3-methyl-5-amino-pyrazole | yellow |
| 81 | 1-benzyl-3-methyl-5-amino-pyrazole | yellow |
| 82 | 1-(β-cyanoethyl)-3-methyl-5-amino-pyrazole | yellow |
| 83 | 1-phenyl-3-methoxy-5-amino-pyrazole | yellow |
| 84 | 2-methyl-4H-pyrazolo-[2,3a]-benzimidazole | orange |

-Continued

| No. | A | B |
|---|---|---|
| 85 | 1-ethyl-3-cyano-4-methyl-6-hydroxy-pyridone-(2) | orange |
| 86 | 2,6-dihydroxy-3-cyano-4-methyl-pyridine | orange |
| 87 | 1-phenyl-3-methyl-pyrazolone-(5) | yellow |
| 88 | 1-(β-hydroxyethyl)-3-methyl-pyrazolone-(5) | yellow |
| 89 | 1-phenyl-pyrazolone-(5)-carboxylic acid-(3)-ethylester | yellow |
| 90 | 1-butyl-4-hydroxy-quinoline-(2) | yellow |
| 91 | 2-methyl-indole | orange |
| 92 | 2-phenyl-indole | orange |
| 93 | 1,2-dimethyl-indole | orange |
| 94 | 1-methyl-2-phenyl-indole | orange |
| 95 | 2,6-di-(methylamino)-4-phenylamino-pyrimidine | red |
| 96 | 2-phenylamino-4-methyl-thiazole | bluish red |
| 97 | 2-methylamino-4-phenyl-thiazole | bluish red |
| 98 | 3,7-dihydroxy-1,2,3,4-tetrahydro-benzo[h]-quinoline | green |
| 99 | N-(β-cyanoethyl)-3-methyl-aniline | yellowish red |
| 100 | N-(β-cyanoethyl)-3-methoxy-aniline | yellowish red |
| 101 | N-(β-cyanoethyl)-3-ethoxy-aniline | yellowish red |
| 102 | N-(β-cyanoethyl)-3-chloro-aniline | yellowish red |
| 103 | N-(β-cyanoethyl)-3-acetamino-aniline | red |
| 104 | N-butyl-N-(β-acetoxyethyl)-aniline | red |
| 105 | N-ethyl-N-(β-acetoxyethyl)-3-methyl-aniline | red |
| 106 | N,N-bis-(β-methoxyethyl)-3-acetylamino-aniline | blue-red |
| 107 | N,N-bis-(β-ethoxyethyl)-3-acetylamino-aniline | blue-red |
| 108 | N,N-bis-(β-methoxyethyl)-3-methoxy-carbonyl-amino-aniline | blue-red |
| 109 | N-ethyl-N-benzyl-3-acetylamino-aniline | blue-red |
| 110 | N-methyl-N-benzyl-3-methoxy-carbonylamino-aniline | blue-red |
| 111 | N-ethyl-N-(β-methylaminocarbonyloxyethyl)-aniline | red |
| 112 | N-ethyl-N-(β-phenylaminocarbonyloxyethyl)-3-methyl-aniline | red |

When the diazo component used in Example 1 (b) is replaced with equimolar amounts of one of the compounds listed below and the resultant diazonium salts are coupled with the coupling components mentioned in Example 1 (b) or in the preceding Table, then very valuable dyestuffs are again obtained, which dye polyester fibres in the shades given for the respective coupling components.

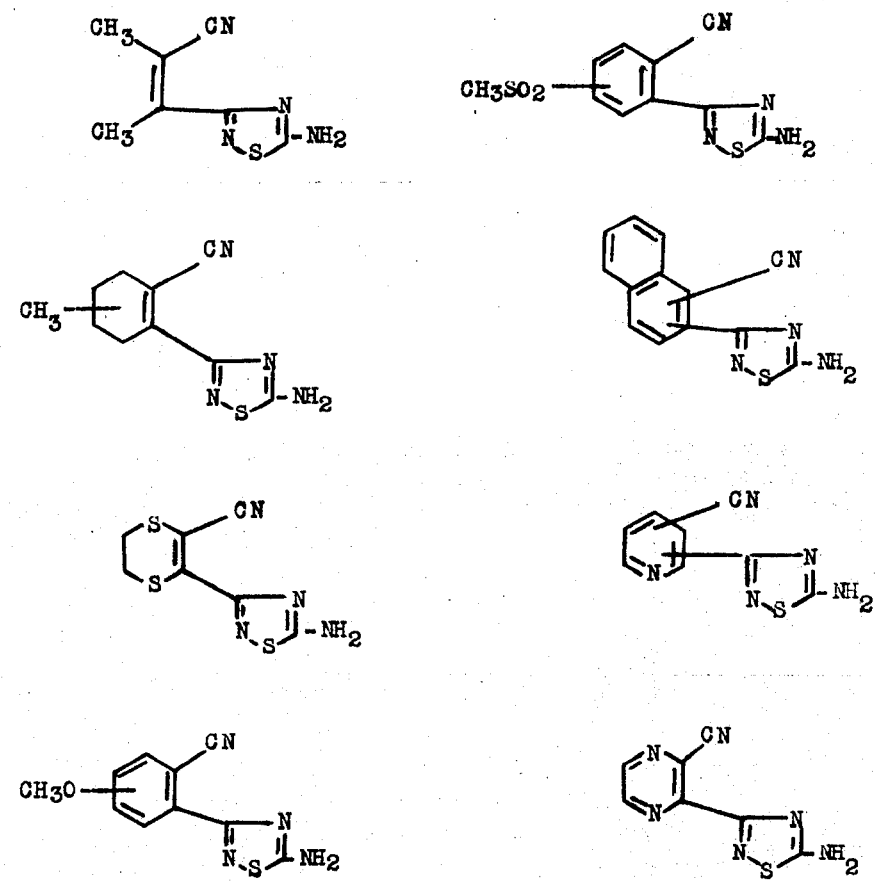

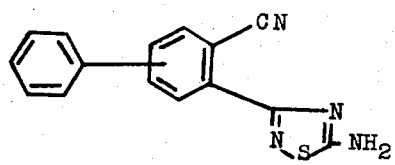
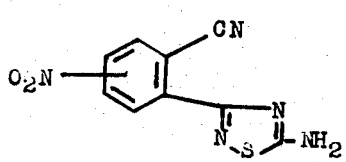

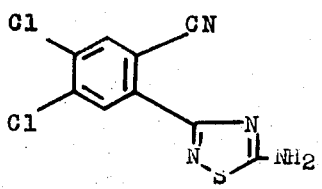

Example 2(b)

0.1 g of the well dispersed dyestuff of the formula

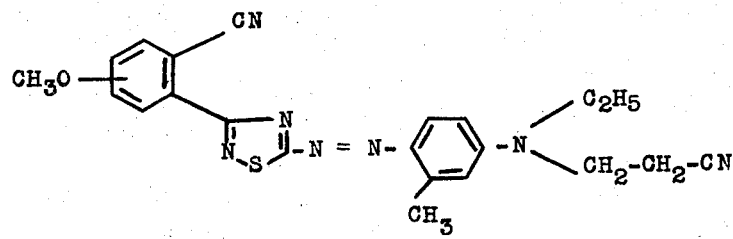

is introduced at 40°C into 1 litre of water containing, in addition, 0.2 g sodium dinaphthyl-methane-sulphonate as well as 0.3 g cresotic acid methyl ester. 10 g of a fabric of polyethylene terephthalate are introduced into this bath, the temperature of the dyebath is raised to 100°C within about 20 minutes, and dyeing is carried out at the same temperature for 60 – 90 minutes. A strong red dyeing of good fastness to wet processing, sublimation and light is obtained.

When the substrate is replaced in the present Example with 10 g of a fabric of cellulose triacetate, then a clear red dyeing of good general fastness properties is likewise obtained.

Example 4(b)

0.1 g of the dyestuff of the formula

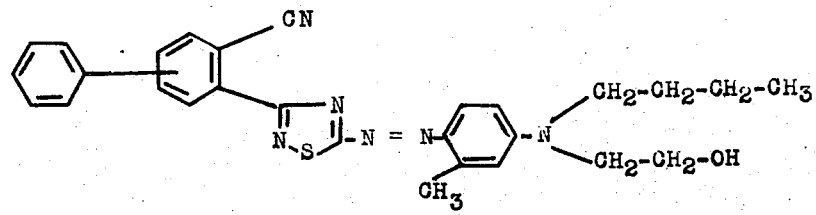

are introduced in well dispersed form at 40° – 50°C in to 1 litre of water containing, in addition, 0.5 g of a sulphite cellulose decomposition product. 20 g of a yarn of poly-ε-caprolactam are introduced into this bath, the temperature is raised to 95° – 100°C within about 20 minutes, and dyeing is carried out for 1 hour. After rinsing and drying, there results a clear strongly bluish red dyeing of good fastness to wet processing and light.

Example 5 (b)

10.6 g of the thiodiazole of the formula

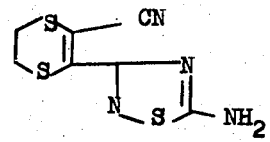

are diazotised with 7.5 ml of 41.2 percent-strength nitrosylsulphuric acid in a mixture of 160 ml of glacial acetic acid and 80 ml of propionic acid. For diazotisation, there is added, at −5 to 0°C, a solution of 15.3 g [2-(N-ethyl-N-phenylamino)-ethyl]-benzyl-dimethylammonium chloride in 50 ml of glacial acetic acid. After 30 minutes, the mixture is poured with stirring on to 200 g of ice, gradually diluted with 500 ml of ice-water, the pH of the solution is adjusted to 4 – 5 at a maximum temperature of 10°C, and the resultant red dyestuff is salted out with sodium chloride. The precipitate is filtered off with suction, washed with a 10 percent sodium chloride solution, and dried. The product corresponds to the formula

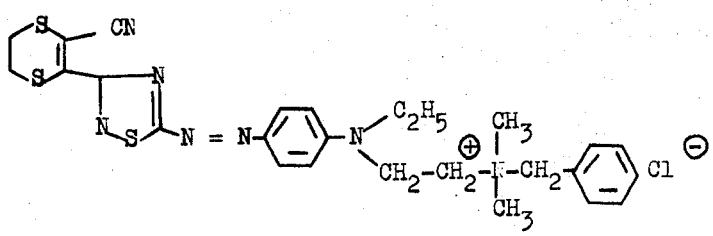

0.5 g of the dyestuff obtained are dissolved in 3 litres of water with the addition of 3 ml of 30 percent acetic acid. 100 g of polyacrylonitrile yarn are introduced into this bath at 40° – 50°C, the temperature of the dyebath is raised to 100°C within about 40 minutes, and dyeing is carried out at the same temperature for about 1 hour.

There results a clear red dyeing of excellent fastness properties.

Dyestuffs of similar properties are obtained when the diazonium salt prepared in the present Example is combined with the coupling components listed in Column A of the following Table. The shades of the dyestuffs on acrylic fibres are given in Column B:

| No. | A | | B |
|---|---|---|---|
| 1 | | $Cl^\ominus$ | blue-red |
| 2 | | $Cl^\ominus$ | blue-red |
| 3 | | $Br^\ominus$ | red |
| 4 | | $Cl^\ominus$ | red |
| 5 | | $ZnCl_3^\ominus$ | red |
| 6 | | $ZnCl_3^\ominus$ | blue-red |
| 7 | | $CH_3COO^\ominus$ | red |

Table — Continued
| No. | A | B | |
|---|---|---|---|
| 8 | 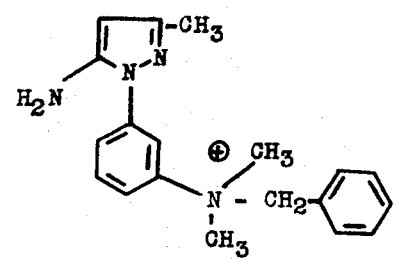 | Cl⁻ | yellow |
| 9 | 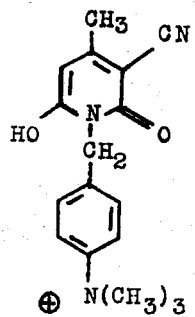 | ZnCl₃⁻ | orange |
| 10 | 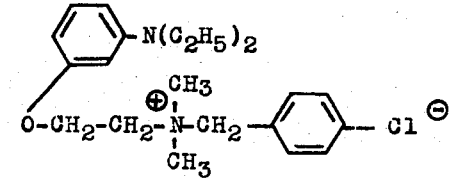 | | blue-red |
| 11 | 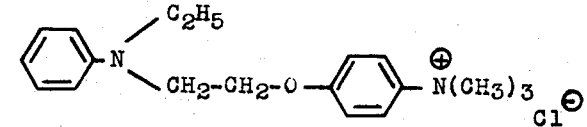 | | red |
| 12 | 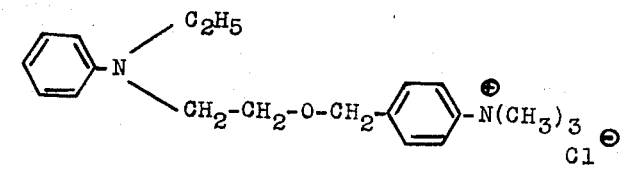 | | red |
| 13 | 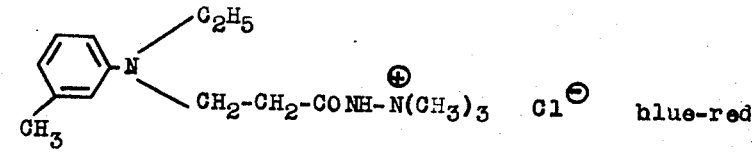 | | blue-red |
| 14 | 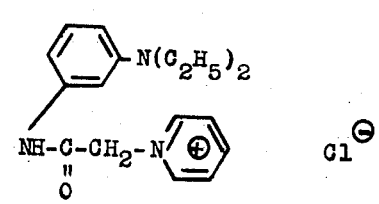 | | blue-red |

Table—Continued

| No. | A | B |
|---|---|---|
| 15 | 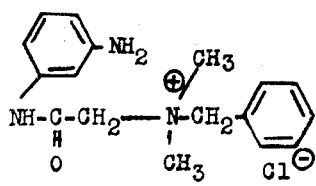 | red |
| 16 | 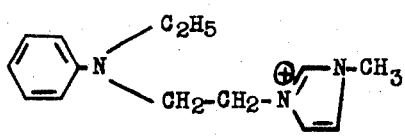 | red |

By replacing the 5-amino-1,2,4-thiodiazole used in Example 5(b) as starting material with equimolar amounts of one of the following diazo components and combining the resultant diazonium salts with the coupling components mentioned in Example 5(b) and in the preceding Table, there are likewise obtained valuable dyestuffs which dye acrylic fibres in the shades given for the respective coupling components.

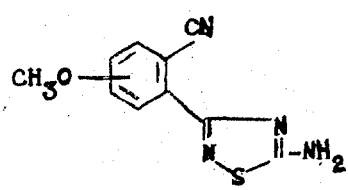
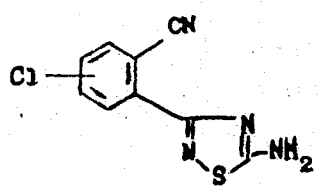
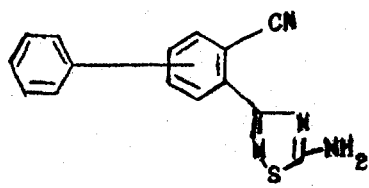
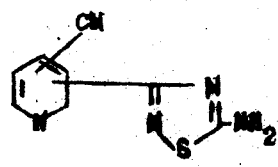
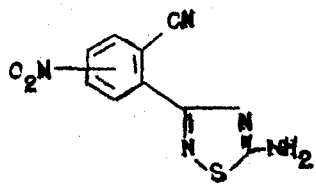
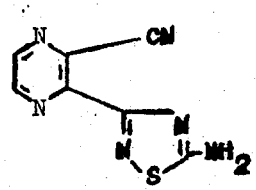
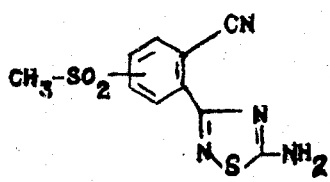
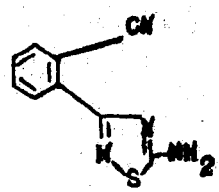

An outstanding affinity on polyacrylonitrile materials characterises the dyestuffs of the formulae

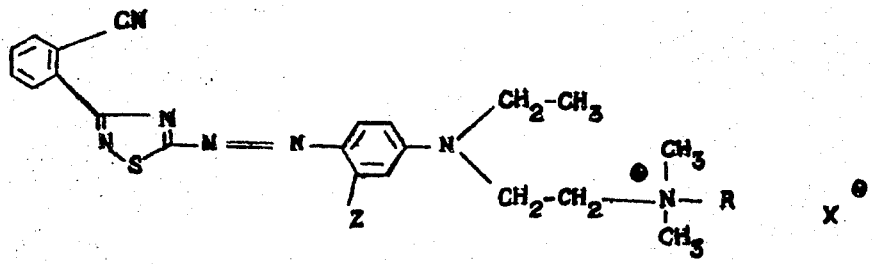

and

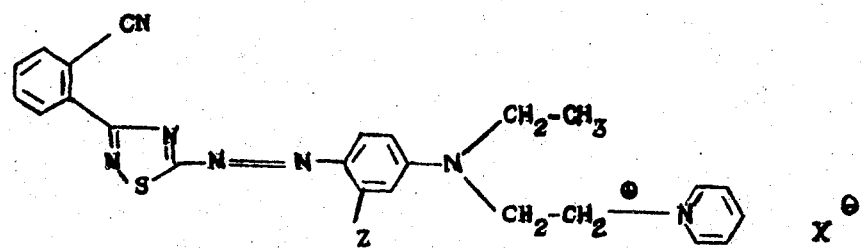

in which

Z stands for H or CH₃ and R stands for —CH₃, —CH₂—CH=CH₂, —CH₂—C₆H₅ or NH₂ and X stands for an anion, preferably Cl.

The red (Z=H) or blue-red (Z=CH₃) dyeings possess very good general fastnesses. To be emphasised are the excellent fastnesses to light and decatising.

Example 6(b)

8.8 g 5-amino-3-(2'-cyanophenyl)-1,2,4-thiodiazole are diazotised as in Example 1, and the resultant diazo solution is very slowly added at —5° to 0°C with stirring to a solution of 6.3 g 2-hydroxy-naphthalene in 200 ml dioxan. By the dropwise addition of a 20 percent sodium hydroxide solution care is taken at the same time that the pH value of the coupling mixture does not fall below 4. When the coupling is completed, 500 g of ice are added, and the resultant precipitate is filtered off with suction and washed with water until free from salt.

1 g of the resultant orange-coloured dyestuff of the formula

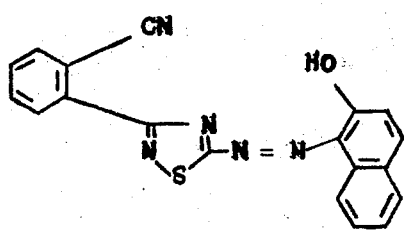

1 g sodium dinaphthyl-methane-sulphonate and 15 ml of water are ground in a ball mill for about 24 hours. The resultant paste is worked into a printing paste with the addition of 5 g urea, 4 g ammonium sulphate, 2.5 g sodium alginate and 75 ml of water. A fabric of nickel-modified polypropylene is printed with this paste, the fabric is dried, steamed for 30 minutes, rinsed and soaped. A bluish red print of good general fastness properties is obtained.

When the 2-hydroxy-naphthalene used in the present Example as coupling components is replaced with equimolar amounts of the compounds mentioned in Column A of the following Table, then dyestuffs are obtained, which dye Nipolypropylene fibres in the shades indicated in Column B:

| No. | A | B |
|---|---|---|
| 1 | 1-hydroxy-4-methyl-naphthalene | blue-red |
| 2 | 1-hydroxy-4-methoxy-naphthalene | blue-red |
| 3 | 5-hydroxy-acenaphthene | blue-red |
| 4 | 1-hydroxy-4-methyl-benzene | violet |
| 5 | 1-hydroxy-4-methoxy-benzene | violet |
| 6 | 1-hydroxy-4-cyclohexyl-benzene | violet |
| 7 | 1-phenyl-3-methyl-pyrazolone-(5) | yellow |
| 8 | 8-hydroxy-quinoline | red |
| 9 | 3-hydroxy-K,N-diethyl-aniline | red |
| 10 | 3-hydroxy-diphenylamine | blue-red |
| 11 | acetylacetone | yellow |
| 12 | acetoacetic acid anilide | yellow |

When the 3-amino-3-(2'-cyanophenyl)-1,2,4-thiodiazole is replaced in Example 6(b) and in the preceding Table with one of the diazo components listed below, then dyestuffs are likewise obtained, which dye nickel-propylene fibres in the shades given for the respective coupling components:

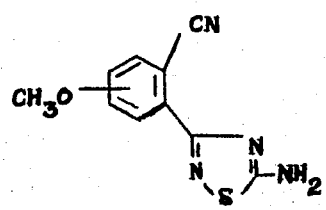

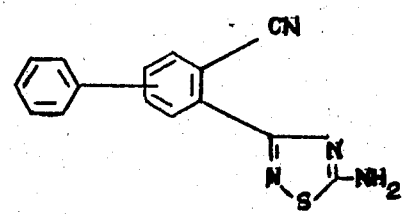

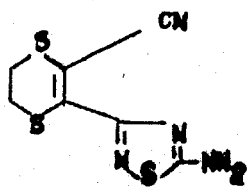

Example 7(b)

1 g of the dyestuff of the formula prepared in analogy with Example 1(b)

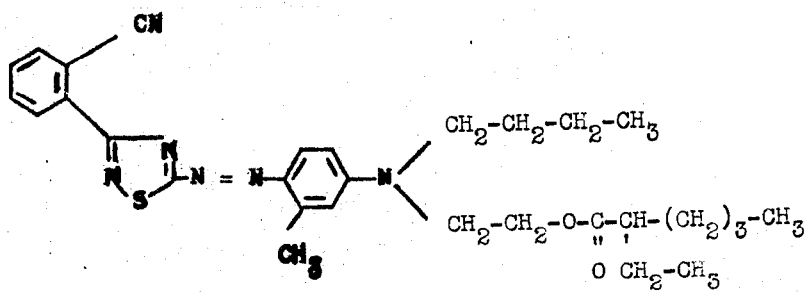

are dissolved in 99 g tetrachloroethylene. A fabric of polyethylene terephthalate fibres is impregnated with this solution at room temperature, subsequently squeezed to a weight increase of 60 percent, and dried at 80°C for 1 minute. The dyestuff is then fixed by heating the fabric at 190°-220°C for 45 seconds. The small proportion of non-fixed dyestuff is washed out by treating the fabric with cold tetrachloro-ethylene for 20 seconds. After drying, there is obtained a clear bluish red dyeing which is characterised by its high dyestuff yield, very good texture and good fastness properties, especially by very good fastness to thermofixing, washing, rubbing and light.

Equally satisfactory clear red dyeings can be obtained analogously on fabrics of cellulose triacetate and polyhexamethylene-diamine adipate.

In Column A of the following Table there are listed further dyestuffs which dye polyester materials according to the process described in the present Example in the shades given in Column B. Mixtures of these dyestuffs can also be used to advantage.

| No. | A | B |
|---|---|---|
| 1 | (structure) | red |
| 2 | (structure) | yellowish red |
| 3 | (structure) | yellowish red |

Table — Continued
| No. | A | B |
|---|---|---|
| 4 | 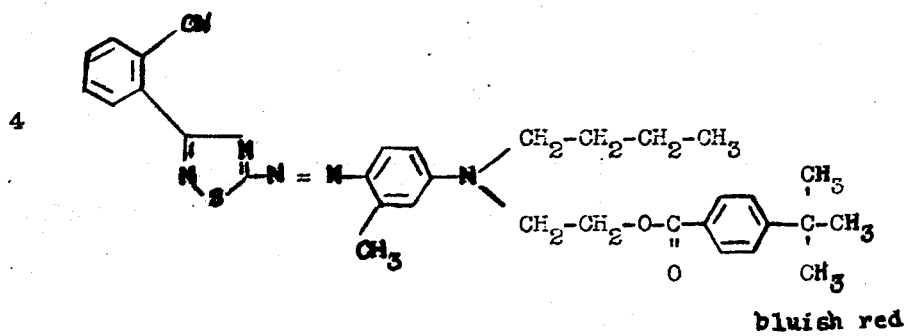 | bluish red |
| 5 | 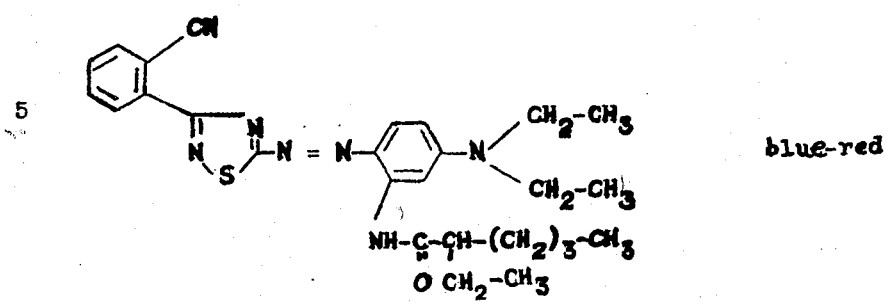 | blue-red |
| 6 | 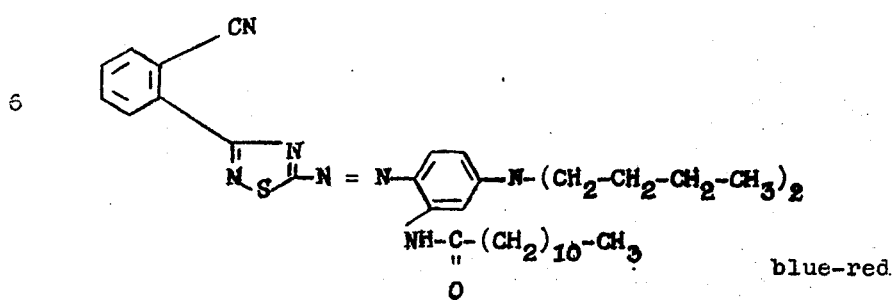 | blue-red |
| 7 | 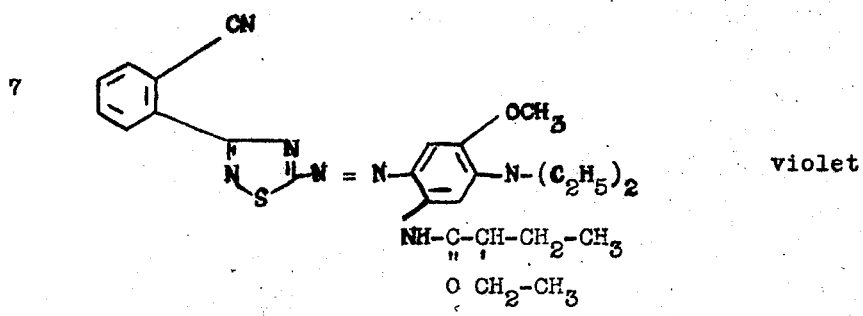 | violet |
| 8 | 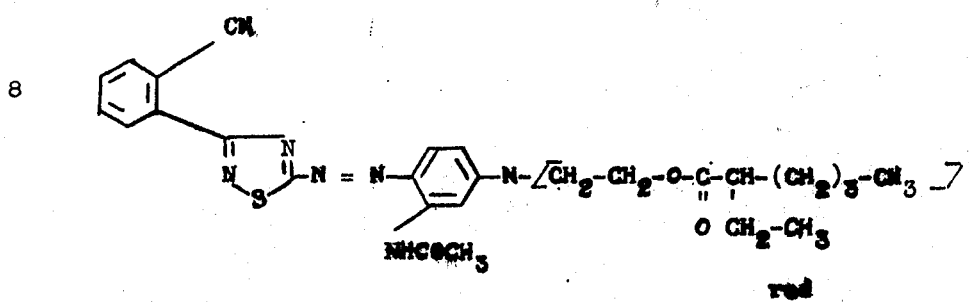 | red |

| No. | A | B |
|---|---|---|
| 9 | 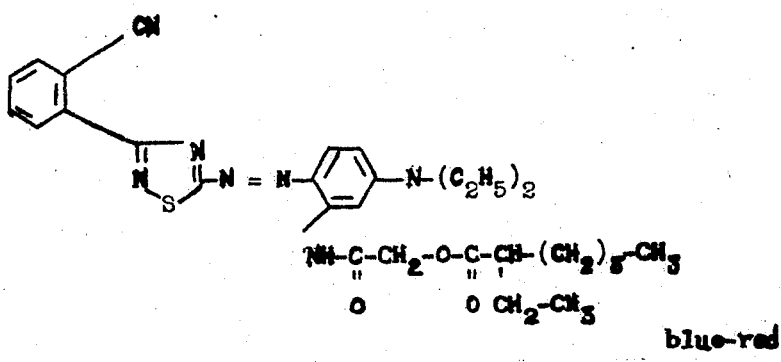 | blue-red |
When the diazo component in the dyestuff Examples on pages 58 – 61 is replaced with one of the compounds listed below, then products are likewise obtained, which yield on polyester materials the shades mentioned in Column B, when applied according to the instructions of Example 7(b):
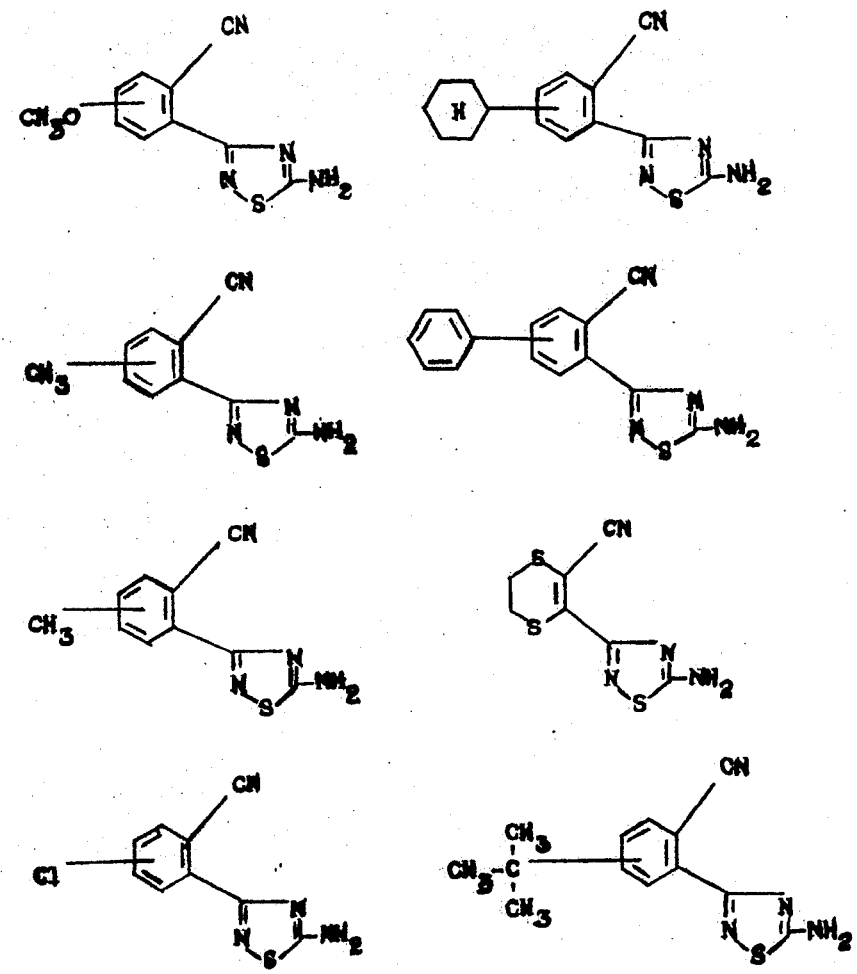

I claim:
1. Azo dyestuff of the formula

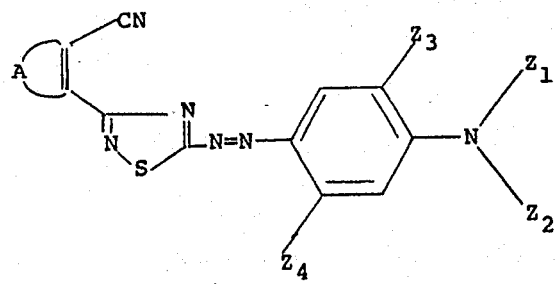

wherein

A is

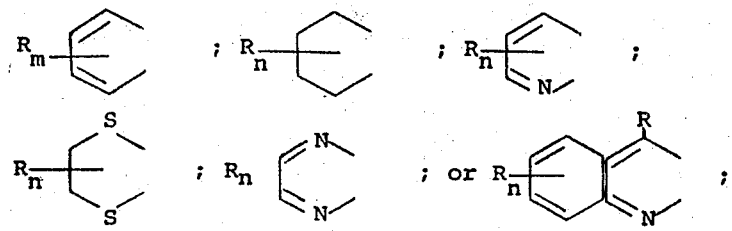

R is hydrogen, $C_1$-$C_4$-alkyl, phenyl, $CF_3$, chloro, nitro,
$C_1$-$C_4$-alkyl-$SO_2$-, phenyl-$SO_2$-, or $C_1$-$C_4$-alkoxy;
m is 1, 2, or 3;
n is 1 or 2;
$Z_1$ and $Z_2$ are hydrogen, benzyl, phenylethyl, or are $C_1$-$C_5$-alkyl which is unsubstituted or substituted by chloro, nitro, cyano, hydroxy, trimethylammonium, benzyldimethylammonium, allyldimethylammonium, pyridinium, imidazolium, triazolium, dimethylhydrazinium,

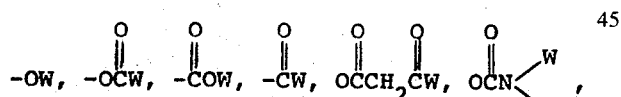

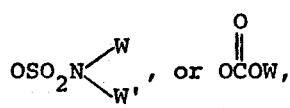

wherein W is $C_1$-$C_2$-alkyl, phenyl, or benzyl; and W' is hydrogen or $C_1$-$C_2$-alkyl;
$Z_2$, in addition is phenyl;
$Z_3$ and $Z_4$ are hydrogen, methyl, ethyl, $CF_3$, chlorine,
$Z_3$, in addition, is phenoxy; and
$Z_4$, in addition, is cyano, formylamino, $C_1$-$C_{12}$-alkylcarbonylamino, benzylcarbonylamino, phenylcarbonylamino, tolylcarbonylamino, furylcarbonylamino, thienylcarbonylamino, pyridylcarbonylamino, methylsulphonylamino, ethylsulphonylamino, phenylsulphonylamino, p-toylsulphonylamino, methoxycarbonylamino, phenoxycarbonylamino, aminocarbonylamino, dimethylaminocarbonylamino, cyclohexylaminocarbonylamino, phenylaminocarbonylamino, dimethylaminosulphonylamino, or $C_1$-$C_{12}$-alkylcarbonylamino substituted by fluoro, chloro, bromo, cyano, $C_1$-$C_4$-alkoxy, phenoxy, or $C_1$-$C_4$-alkylcarbonyloxy.

2. Azo dyestuff of the formula

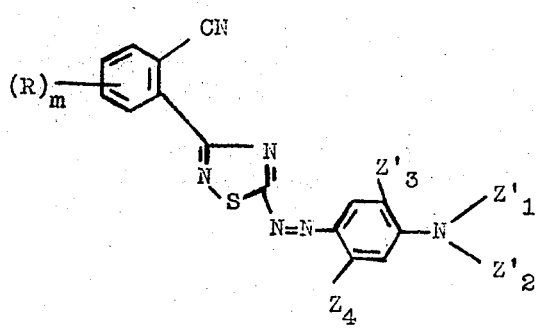

in which
R means hydrogen, methyl, phenyl, chloro, methoxy, $NO_2$, or $CH_3SO_2$-;
m means 1, 2 or 3;
$Z'_1$ and $Z'_2$, independently of one another, mean hydrogen, methyl, ethyl, n-propyl, n-butyl, chloroethyl, cyanoethyl, hydroxy-ethyl, methylcarbonyloxyethyl, methoxycarbonyloxyethyl, ethoxycarbonyloxy-ethyl, methoxycarbonylethyl or ethoxycarbonylethyl;
$Z'_3$ means hydrogen, chloro, methyl, methoxy, ethoxy or phenoxy; and
$Z_4$ means hydrogen, chloro, methyl, methoxy, acetylamino or propionylamino.

3. Azo dyestuff of the formula
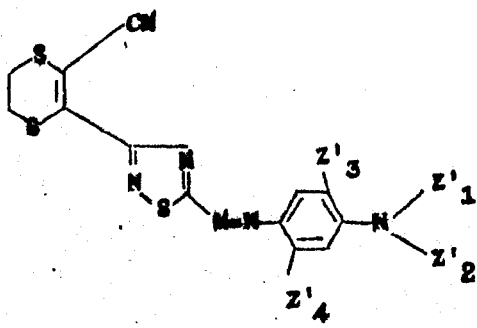
in which
Z'$_1$ to Z'$_4$ have the same meaning as in claim 2.
4. Azo dyestuff of the formula
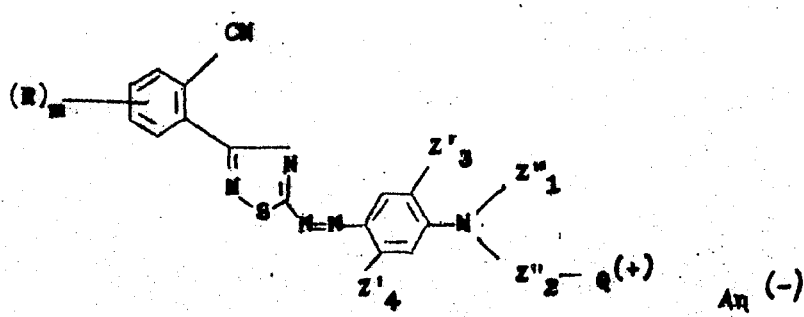
in which
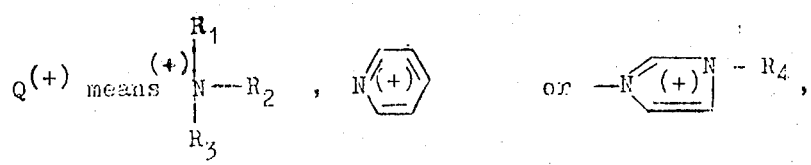
R, m, Z'$_3$ and Z'$_4$ have the same meaning as in claim 3;
Z''$_1$, R$_1$, R$_2$ and R$_4$ stand for C$_1$-C$_4$-alkyl;
Z''$_2$ stands for C$_1$-C$_4$-alkylene;
R$_3$ stands for C$_1$-C$_4$-alkyl, benzyl, allyl or -NH$_2$; An$^{(-)}$ means an anion.
5. Azo dyestuff of the formula
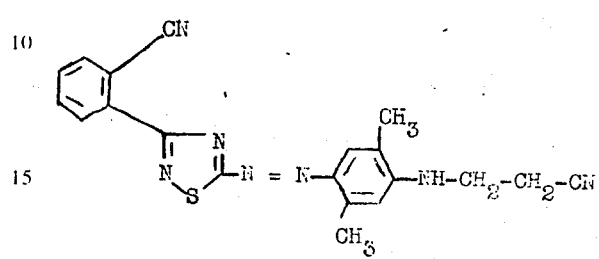
* * * * *